(12) United States Patent
Annabi et al.

(10) Patent No.: US 11,028,211 B2
(45) Date of Patent: Jun. 8, 2021

(54) BIOCOMPATIBLE AND CONDUCTIVE HYDROGELS WITH TUNABLE PHYSICAL AND ELECTRICAL PROPERTIES

(71) Applicant: Northeastern University, Boston, MA (US)

(72) Inventors: Nasim Annabi, Cambridge, MA (US); Iman Noshadi, Cambridge, MA (US)

(73) Assignee: Northeastern University, Boston, MA (US)

( * ) Notice: Subject to any disclaimer, the term of this patent is extended or adjusted under 35 U.S.C. 154(b) by 107 days.

(21) Appl. No.: 16/061,030

(22) PCT Filed: Dec. 29, 2016

(86) PCT No.: PCT/US2016/069340
§ 371 (c)(1),
(2) Date: Jun. 11, 2018

(87) PCT Pub. No.: WO2017/117467
PCT Pub. Date: Jul. 6, 2017

(65) Prior Publication Data
US 2018/0362693 A1   Dec. 20, 2018

Related U.S. Application Data

(60) Provisional application No. 62/272,627, filed on Dec. 29, 2015.

(51) Int. Cl.
*C08F 251/00*   (2006.01)
*C08F 289/00*   (2006.01)
(Continued)

(52) U.S. Cl.
CPC ............ *C08F 265/06* (2013.01); *C08H 1/00* (2013.01); *C08L 5/04* (2013.01); *C08L 5/08* (2013.01); *C08L 67/04* (2013.01); *C08L 89/00* (2013.01); *H01B 1/12* (2013.01); *C08F 220/36* (2013.01); *C08F 251/00* (2013.01);
(Continued)

(58) Field of Classification Search
None
See application file for complete search history.

(56) References Cited

FOREIGN PATENT DOCUMENTS

| WO | 2010023490 A1 | 3/2010 |
|----|---------------|--------|
| WO | 2010078300 A1 | 7/2010 |
| WO | 2015001564 A1 | 1/2015 |

OTHER PUBLICATIONS

Jia, X. et al. "Bioconnpatible Ionic Liquid-Biopolymer Electrolyte-Enabled Thin and Compact Magnesium-Air Batteries". ACS Applied Materials & Interfaces 2014, 6(23), 21110-21117. (Year: 2014).*

(Continued)

*Primary Examiner* — Richard A Huhn
(74) *Attorney, Agent, or Firm* — Verrill Dana, LLP

(57) ABSTRACT

A biodegradable and biocompatible hydrogel of tunable conductivity is provided. The hydrogel includes a polymer conjugated to a bio-ionic liquid. The mechanical and electrical properties of the hydrogel can be varied by altering the ratio of the polymer to the bio-ionic liquid in the conjugated polymer. These properties can be varied also by changing the percent weight of the conjugated polymer in the hydrogel. A method for preparing the hydrogel is also provided.

12 Claims, 30 Drawing Sheets

(51) Int. Cl.
| | |
|---|---|
| C08L 5/00 | (2006.01) |
| C08L 5/04 | (2006.01) |
| C08L 51/02 | (2006.01) |
| C08L 51/08 | (2006.01) |
| C08F 265/06 | (2006.01) |
| H01B 1/12 | (2006.01) |
| C08H 1/00 | (2006.01) |
| C08L 5/08 | (2006.01) |
| C08L 67/04 | (2006.01) |
| C08L 89/00 | (2006.01) |
| C08F 220/36 | (2006.01) |

(52) U.S. Cl.
CPC ........ *C08F 289/00* (2013.01); *C08G 2210/00* (2013.01); *C08L 51/02* (2013.01); *C08L 51/08* (2013.01)

(56) References Cited

OTHER PUBLICATIONS

Jia, X. et al. "Biocompatible Ionic Liquid-Biopolymer Electrolyte-Enabled Thin and Compact Magnesium-Air Batteries". ACS Applied Materials & Interfaces 2014, 6(23), 21110-21117. (Year: 2014).*

Winther-Jensen, O. et al. "Self polymerising ionic liquid gel". Chem. Comm. 2009, 21, 3041-3043. (Year: 2009).*

Sharma, et al., "Preparation of tamarind gum based soft ion gels having thixotropic properties", Carbohydrate Polymers, vol. 102, Dec. 7, 2013, pp. 467-471.

Wu, et al., "Fabrication of conductive polyaniline hydrogel using pologen leaching and projection microstereolithography", Journal of Materials Chemistry B, vol. 3, Jun. 10, 2015, pp. 5352-5360.

Noshadi SR., et al., Novel Bio-Ionic Liquid Functionalized Conductive Hydrogel for Cardiac Tissue Regeneration:, 2016 AIChE Annual Meeting, Nov. 17, 2016, entire document.

Mukesh, et al., "A Polymerizable Bionic Liquid Based Nanogel: A New Nanocarrier for an Anticancer Drug", Macromolecular Chemistry and Physics, 2014, 215, 1498-1504.

Yue, K., et al., "Synthesis, properties, and biomedical applications of gelatin methacryloyl (GelMA) hydrogels", Biomaterials, Dec. 2015; 73: 254-271. doi:10.1016/j.biomaterials.2016.08.045.

Sirivisoot, S., et al., "Protocol and cell responses in thee-dimensional conductive collagen gel scaffolds with conductive polymer nanofibres for tissue regeneration", Interface Focus, 4, 20130050. (https:dx.doi.org/10.1098/rsfs.2013.0050).

Ge, J., et al., "Drug Release from Electric Field Responsive Nanoparticles", ACS Nano Jan. 24, 2012; 6(1): 227-233. doi:10.1021/nn203430m.

Wang, Q., et al., "Injectable, degradable, electroactive nanocomposite hydrogels containing conductive polymer nanoparticles for biomedical applications.", Int. J. Nanomedicine, 2016: 11, 131-145.

Kotanen, C. N., et al., "The effect of the physicochemical properties of bioactive electroconductive hydrogels on the growth and proliferation of attachment dependent cells.", Biomaterials, vol. 34, Issue 27, Sep. 2013, pp. 6318-6327.

Shin, R. S., et al., "Carbon-Nanotube-Embedded Hydrogel Sheets for Engineering Cardiac Constructs and Bioactuators", ACS Nano. Mar. 26, 2013; 7(3): 2369-2380. doi:10.1021/nn305559j.

Kloxin, A. M., et al., "Mechanical properties of cellularly responsive hydrogels and their experimental determination", Advanced Materials, Aug. 17, 2010; 22(31): 3484-3494. doi:10.1002/adma.200904179.

Park, H. et al., "The Significance of Pore Microarchitecture in a Multi-Layered Elastomeric Scaffold for Contractile Cardiac Muscle Constructs", Biomaterials. Mar. 2011 ; 32(7): 1856-1864. doi:10.1016/j.biomaterials.2010.11.032.

Schmidt, C. E., et al. "Stimulation of neurite outgrowth using an electrically conducting polymer.", Proc. Natl. Acad. Sci. USA, vol. 94, pp. 8948-8953, Aug. 1997, Applied Biological Sciences.

Abidian, M. R., et al., "Experimental and theoretical characterization of implantable neural microelectrodes modified with conducting polymer nanotubes.", Biomaterials. Mar. 2008 ; 29(9): 1273-1283. doi:10.1016/j.biomaterials.2007-11.022.

Cao, B., et al., "Integrated zwitterionic conjugated poly(carboxybetaine thiophene) as a new biomaterial platform", Chem. Sci., 2015, 6, pp. 782-788.

Annabi, N., et al., "Controlling the porosity and microarchitecture of hydrogels for tissue engineering.", Tissue Engineering: Part B Rev, vol. 16, No. 4, 2010, pp. 371-383, © Mary Ann Liebert, Inc., doi: 10.1089/ten.teb.2009.0639.

Annabi, N., et al., "Highly Elastic and Conductive Human-Based Protein Hybrid Hydrogels.", Ad. Mater. Jan. 6, 2016; 28(1): 40-49. doi: 10.1002/adma.201503255.

Nichol, J. W., et al., "Cell-laden microengineered gelatin methacrylate hydrogels.", Biomaterials, Jul. 2010 ; 31(21): 5536-5544. doi:10.1016/j.biomeaterials.22010.03.064.

Mihic, A., et al., "A Conductive Polymer Hydrogel Supports Cell Electrical Signaling and Improves Cardiac Function After Implantation into Myocardial Infarct."

Koshy, S. T., et al., "Injectable, porous, and cell-responsive gelatin cryogels.", Biomaterials. Mar. 2014 ; 35(8): 2477-2487. doi:10.1016/j.biomaterials.2013.11.044.

Browning, M. B., et al., "Determination of the in vivo degradation mechanism of PEGDA hydrogels.", J Biomed Mater Res A. Dec. 2014 ; 102(12): 4244-4251. doi: 10.1002/jbm.a.35096.

Sepantafar, M., et al., "Stem cells and injectable hydrogels: Synergistic therapeutics in myocardial repair.", Biotechnology Advances 34(4) (2016) 362-379. doi: 10.1016/j.biotechadv.2016.03.003.

Winther-Jensen, O. et al., "Self polymerising ionic liquid gel", Chemical Communications, (2009), No. 21, pp. 3041-3043.

Klingshirn, M.A. et al., "Gelation of Ionic Liquids Using a Cross-Linked Poly(Eyhylene Glycol) Gel Matrix", Chemistry of Materials, (2004), vol. 16, No. 16, pp. 3091-3097.

* cited by examiner

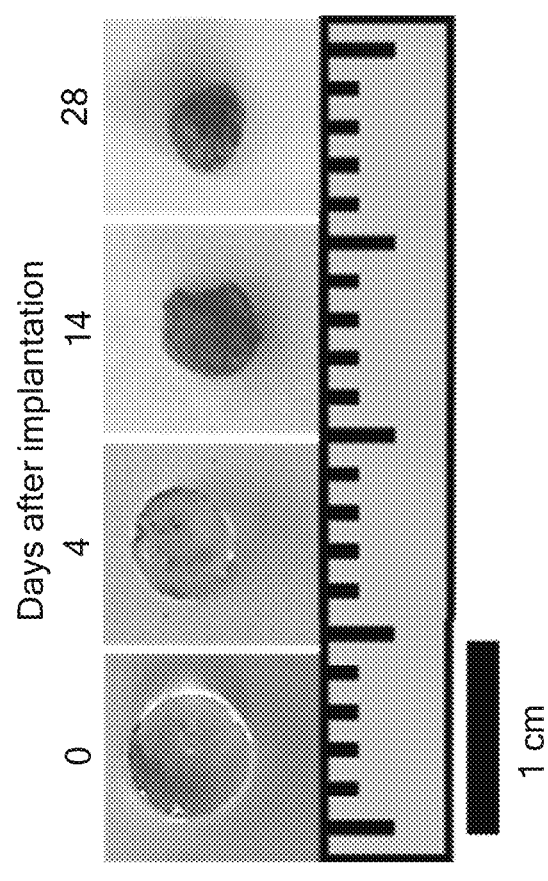
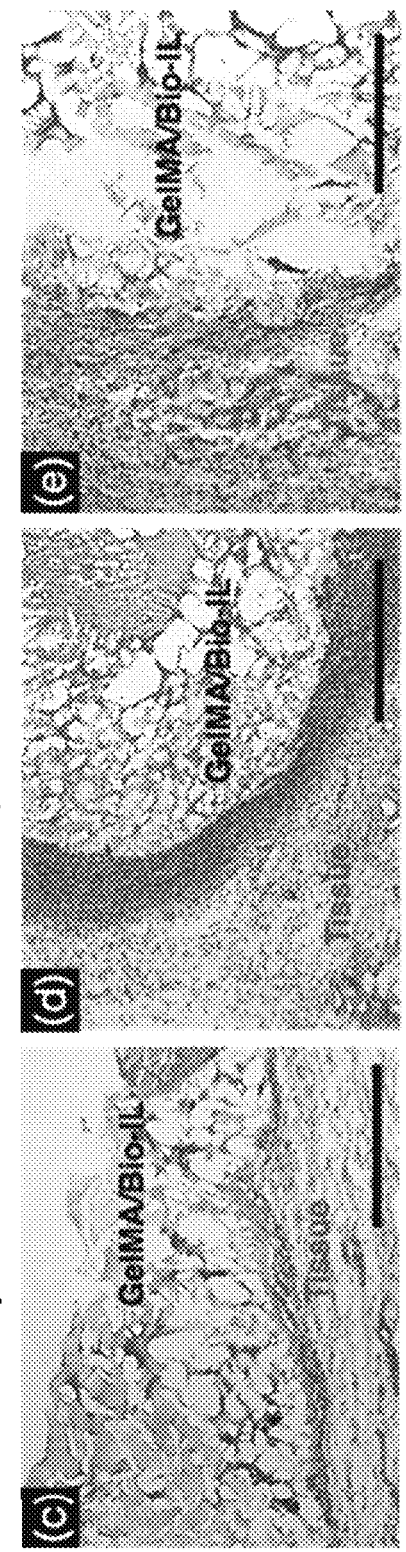
FIG. 6B
FIG. 6C
FIG. 6D
FIG. 6E

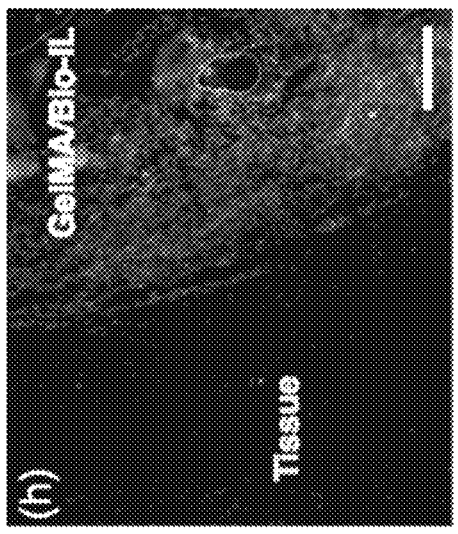
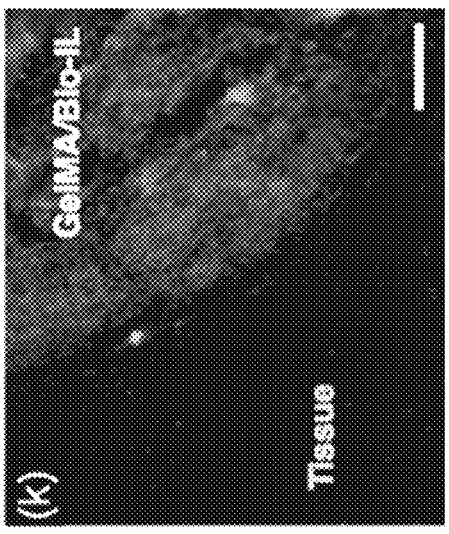
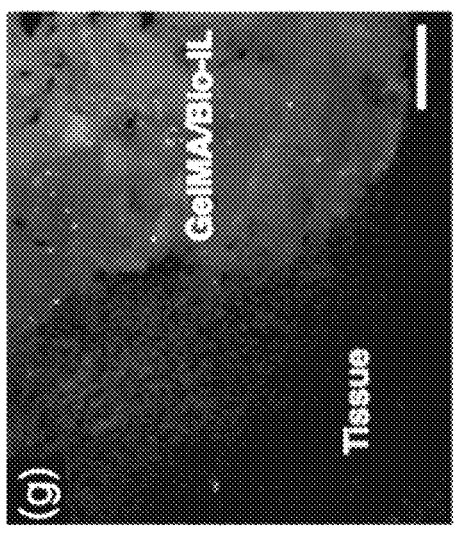
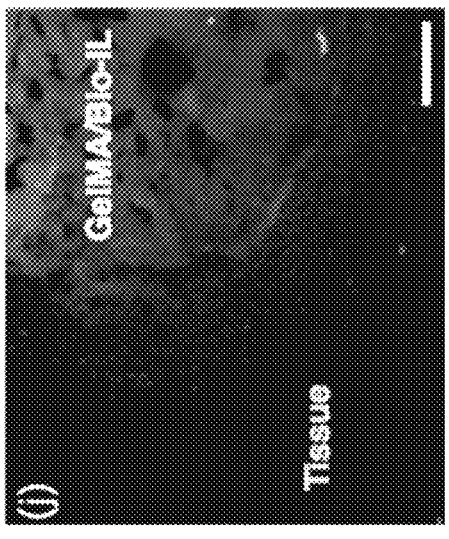
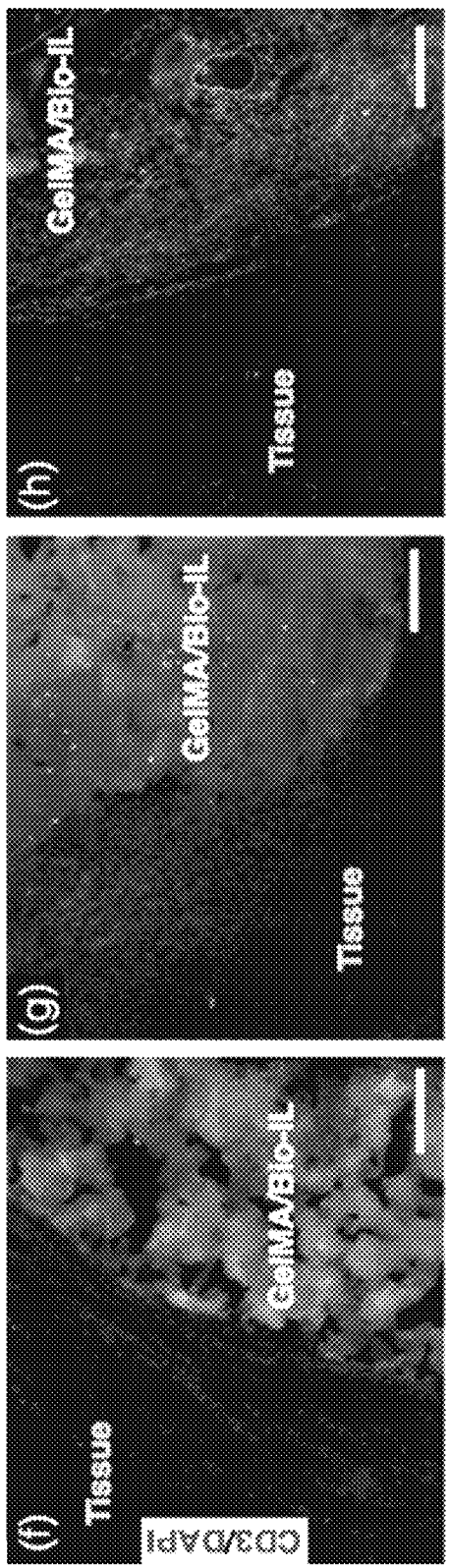
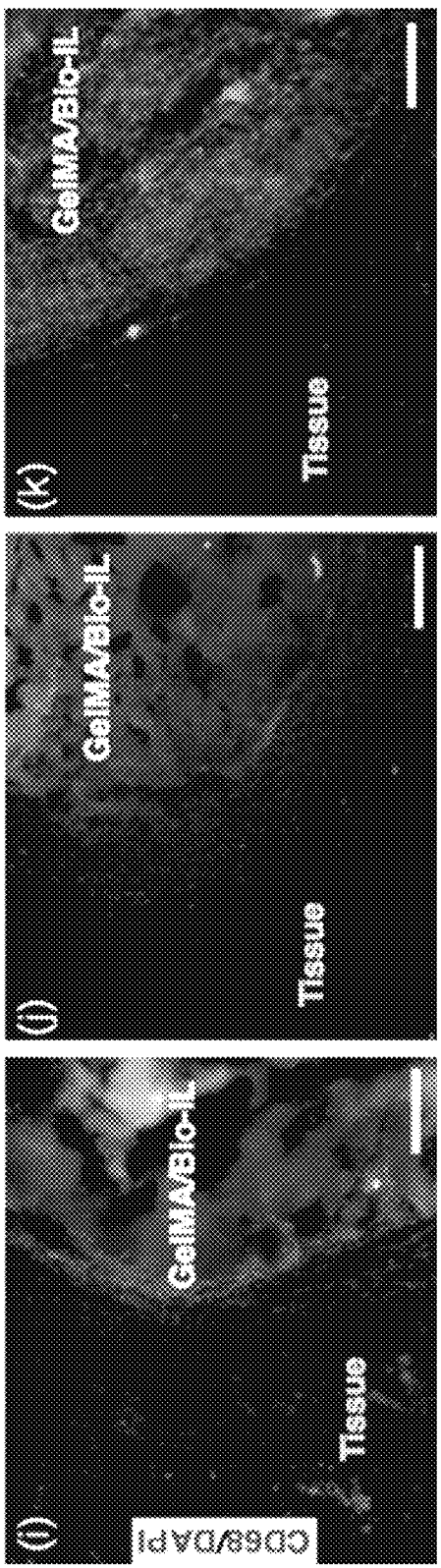
FIG. 6F  FIG. 6G  FIG. 6H
FIG. 6I  FIG. 6J  FIG. 6K

BIOCOMPATIBLE AND CONDUCTIVE HYDROGELS WITH TUNABLE PHYSICAL AND ELECTRICAL PROPERTIES

CROSS-REFERENCE TO RELATED APPLICATIONS

The present application claims the benefit of U.S. Provisional Patent Application Ser. No. 62/272,627 filed on Dec. 29, 2015, which is hereby incorporated by reference in its entirety.

BACKGROUND

Hydrogels are three-dimensional polymeric networks made from highly hydrophilic natural or synthetic monomers rendered insoluble by virtual, electrostatic, or covalent crosslinking (Guiseppi-Elie, A., 2010, Biomaterials, 31, 2701). They are widely used in biomedicine due to their close resemblance to the extracellular matrix (ECM), biocompatibility, and their tunable mechanical and biochemical properties (Yue, K., et al., 2015, Biomaterials, 73, 254; Ullah, F. et al., 2015, Mater Sci Eng C Mater Biol Appl, 57, 414).

However, hydrogels are typically non-conductive, which limits their application as bioactive scaffolds for excitable cells such as nerve and muscle cells (Wu, Y. et al., 2016, Acta Biomaterialia, 33, 122). Electrically conductive hydrogels (ECHs) are a class of new generation smart biomaterials that allow direct delivery of electrical, electrochemical, and electromechanical stimulation. ECHs possess (i) high electrical conductivity, (ii) properties typical of hydrogels, namely, high degree of hydration, swellability, biocompatibility, and diffusivity of small molecules, as well as (iii) optical and electrochemical properties of their electroactive components (Guiseppi-Elie, A. 2010, Biomaterials, 31, 2701). Importantly, they exhibit properties relevant for biomedical applications, especially for applications in the areas of neural and cardiac tissue engineering (Sirivisoot, S. et al., 2014, Interface Focus, 4, 20130050; Green, R. A. et al., 2012, Macromol Biosci, 12, 494; and Baei, P. et al., 2016, Mater Sci Eng C Mater Biol Appl, 63, 131), electrochemical biosensors (Shin, D. S. et al., 2016, Adv Healthc Mater, 5, 659; Li, L. et al., 2015, Nano Lett, 15, 1146; and Brahim, S. et al., 2002, Biosens Bioelectron, 17, 53), and electro-responsive drug delivery systems (Indermun, S. et al., 2014, Int J Pharm, 462, 52; Ge, J. et al., 2012, ACS Nano, 6, 227; and Murdan, S., 2003, J Control Release, 92, 1). In particular, ECHs can be used as temporary scaffolds that enable adhesion, proliferation, migration, and differentiation of different cell types as well as electroactive modulation of neurons, cardiomyocytes, fibroblasts, preosteoblasts, endothelial cells, and mesenchymal stem cells (Baheiraei, N. et al., 2014, Mater Biol Appl, 44, 24; Guo, B. L. et al., 2013, Progress in Polymer Science, 38, 1263; Wang, Q. et al., 2016, Int J Nanomedicine, 11, 131). However, these applications require minimization of noxious inflammatory responses, which could potentially lead to rapid implant dysfunction in vivo (Gerritsen et al., 2000, Biomaterial, 21, 71). The inflammatory responses are a result of the implanted devices being recognized as foreign objects by the immune system and often lead to inhibition of implant function through a process known as foreign body response (FBR) (Major, M. R., et al., 2015, Plast Reconstr Surg, 135, 1489). Macrophages and other immune components react to the foreign implant and the immunologic reaction triggered causes fibrotic encapsulation and physical isolation of the implant ((Guiseppi-Elie, A. 2010, Biomaterials, 31, 2701). Therefore, it is important that engineered ECHs have biochemical characteristics that favor implantation before these materials can be effectively used in biomedical applications.

Biophysical properties of ECHs such as Young's modulus and elasticity influence tissue function, biodegradability, and local cell behavior in vivo (Xu, S. et al., 2016, Appl Biomater, 104, 640; and Engler, A. J. et al., Cell 2006, 126, 677). In particular, water uptake and swellability of a hydrogel can impair its conductivity due to percolation of fluid through it (Baei, P. et al., 2016, Mater Sci Eng C Mater Biol Appl, 63, 131). Several different approaches have been used to modulate the physical features of hydrogels including incorporation of (a) different base polymers, (b) bioactive components, (c) porogens, and (d) hydrophilic or hydrophobic moieties, and varying the degree of crosslinking between the polymer networks constituting the hydrogels (Moreira, L. S., et al., 2014, Int Orthop, 38, 1861; Kotanen, C. N. et al., 2013, Biomaterials, 34, 6318; Mawad, D. et al., 2012, Advanced Functional Materials, 22, 2692).

Existing ECHs and conductive polymers still suffer from several drawbacks, such as poor polymer-cell interactions (due to an absence of cell binding sites), hydrophobicity, poor solubility and processability, non-biodegradability, as well as the fact that their physical properties cannot be optimized (Wu, Y et al., 2016, Acta Biomaterialia, 33, 122; Kaith, B. S. et al., 2015, International Journal of Biological Macromolecules, 75, 266; Kaur, G. et al., 2015, RSC Advances, 5, 37553; Shin, S. R. et al., 2013, ACS Nano, 7, 2369; T. Dvir, T. et al., 2011, Nature Nanotechnology, 6, 720).

Biomaterials have been made conductive through the addition of nanomaterials (e.g. silver nanowires, gold nanoparticles, carbon nanotubes (CNTs), and graphene oxide) or conductive polymers (e.g. polyaniline, polypyrole, polythiophene) to polymeric matrices. However, these approaches have many disadvantages. For example, they often require difficult and prolonged processing and harsh reaction conditions. Further, incorporation of nanomaterials into polymer networks can be difficult; solubility in aqueous media is limited, and the resulting hydrogel can be cytotoxic.

One group of chemicals considered promising for the preparation of engineered materials is room temperature ionic liquids (ILs). Among a variety of ILs, bio-ionic liquids (Bio-ILs) have received much attention in biomedical applications. Bio-ILs are low melting organic salts having the following characteristics: low volatility, high ionic conductivity and electrochemical stability, excellent dissolution capability, and low toxicity (Vijayaraghavan, R. et al., 2010, Chem Commun, 46, 294; and Fukaya, Y et al., 2007, Green Chem, 9, 1155). Bio-ILs have been used as biocompatible and biodegradable materials for various applications such as cancer therapy, multi-responsive drug delivery, sensors, batteries, and biomedical implants. Chicurel, M. E. et al., 1998, Curr Opin Cell Biol, 10, 232; Kloxin, A. M., et al., 2010, Advanced Materials, 22, 3484; Radisic, M. et al., 2013, Mayo Clin Proc, 88, 884; Park, H. et al., 2011 Biomaterials, 32, 1856).

Among the bio-ionic liquids investigated for various purposes, are those based on choline. Choline is a precursor for phospholipids (i.e. phosphatidylcholine and sphingomyelin), the main components of biological membranes. It is produced in human and plant tissues in significant amounts. Furthermore, choline is degraded into smaller molecules by certain microorganisms (Klein, R. et al., 2013, Rsc Adv, 3, 23347). As such, choline and its derivatives are physiologically and environmentally non-toxic. Indeed, cytotoxicity of a class of choline phosphate ionic liquid on a mammalian cell (J774 murine macrophage cell line) showed that choline based Bio-ILs were less cytotoxic than their counterparts in which sodium instead of choline was used as a counter ion (Klein, R. et al., 2013, *Rsc Adv*, 3, 23347). Use of choline based salts and ionic liquids as non-toxic components of various compositions has been described in the following patent/patent applications: DE102009026598; WO 2010/023490; and WO 2010/078300. A biocompatible and implantable battery containing a polymeric electrolyte blend having choline based Bio-ILs embedded in chitosan has also been reported (Jia, X. et al., 2014, *ACS Appl Mater Interfaces*, 6, 21110). The resulting polymer blend was shown to be mechanically robust and highly conductive ($8.9 \times 10^{-3}$ S/cm). The conductive polymeric blend was shown to drive low power implanted medical devices, such as a cardiac pacemaker.

Yet another group of materials that has attracted significant interest for biomedical applications is conjugated polymers. Conjugated polymers have been investigated for use, among others, in tissue engineering (Garner, B. et al., 1999, *Journal of Biomedical Materials* Research, 44, 121; Schmidt, C. E. et al., 1997, *Proc Natl Acad Sci USA*, 94, 8948), wound healing (Collier, J. H. et al., 2000, *J Biomed Mater Res*, 50, 574), biofuel cells (Kim, J. et al., 2006, *Biotechnol Adv*, 24, 296), flexible electronics (Green, R. A. et al., 2009, *Biomaterials*, 30, 3637; Abidian, M. R. et al., 2009, *Advanced Functional Materials*, 19, 573; Abidian, M. R. et al., 2008, *Biomaterials*, 29, 1273) and robotic prostheses (R. A. Green, R. A. et al., 2008, *Biomaterials*, 29, 3393). The wide interest in conjugated polymers is due to their possession of the following characteristics: tunable conductivity and mechanical properties, ease of fabrication over inorganic conductive materials, and flexibility of design, which allows preparation of materials compatible with soft tissues. For example, synthesis of a conjugated polymer based biomaterial consisting of polymer backbones conjugated with multifunctional zwitterionic side chains has been reported (Cao, B. et al., 2015, *Chem Sci*, 6, 782). The backbone of the polymer provides electrical conductivity and the zwitterionic side chains impart biocompatibility, sensitivity to environmental stimuli, and controllable antifouling properties. However, the zwitterionic polymer could not be degraded in vitro or in vivo. In particular, one of the main requisites of hydrogels suitable for use in tissue engineering and drug delivery applications is that they should be able to undergo degradation, which could prevent damage to the surrounding tissues (Dong, D. Y. et al., 2016, *Acs Appl Mater Inter*, 8, 4442).

There remains a need for the development of biocompatible, biodegradable, and conductive biomaterials with tunable conductive and physical properties suitable for biomedical applications such as a temporary scaffold for supporting growth of cells in an implant.

SUMMARY OF THE INVENTION

The present invention provides a new class of polymer-based biomaterials (i.e., electrically conductive hydrogels or ECHs) prepared by conjugating a biocompatible polymer with a bio-ionic liquid (Bio-IL) or a component thereof. Biomaterials thus prepared are intrinsically conductive, and there is no need for adding an electroactive component such carbon nanotubes during their preparation. Their conductivity is tunable by adjusting factors such as the ratio of the bio-ionic liquid component to the polymer. Furthermore, the materials are biocompatible and biodegradable. Methods of preparing these materials are also provided.

A "bio-ionic liquid" as used herein refers to a salt that has a melting temperature below room temperature (e.g., the melting temperature is less than 10° C., less than 15° C., less than 20° C., less than 25° C., less than 30° C., or less than 35° C.) and that contains a cation and an anion, at least one of which is a biomolecule (i.e., a molecule found in a living organism) or a biocompatible organic molecule. Examples of bio-ionic liquids are organic salts of choline, such as carboxylate salts of choline, choline bicarbonate, choline maleate, choline succinate, and choline propionate. An ionic constituent of a bio-ionic liquid is a cation or anion component of a bio-ionic liquid. Examples of ionic constituents of bio-ionic liquids for use in the invention are biocompatible organic cations such as choline and other biocompatible quaternary organic amines, as well as biocompatible organic anions such as carboxylic acids, including formate, acetate, propionate, butyrate, malate, succinate, citrate, and the like.

A "biocompatible polymer" as used herein refers to an organic polymer found in a living organism or compatible with a living organism. The polymer can be naturally occurring or synthetic and charged or uncharged. The polymer is sufficiently hydrophilic to be capable of forming a hydrogel or serving as a component of a hydrogel. Examples of biocompatible polymers for use in the invention include gelatin, elastin, elastin like polypeptides (ELP), chitosan, tropoelastin, collagen, hyaluronic acid (HA), alginate, poly (glycerol sebacate) (PGS), poly(ethylene glycol) (PEG), and poly(lactic acid) (PLA). A biocompatible polymer, conjugate, or other molecule or composition is capable of being in contact with cells without compromising their viability, such as by causing cell death, inhibition of cell proliferation, or exhibiting toxic effects on cellular metabolism or physiology of the organism. For example, a hydrogel is biocompatible if cells applied on its surface or embedded within its matrix remain viable as measured over a period of days, e.g., 5 days, 10 days, or 30 days.

A "biodegradable" polymer, conjugate, or hydrogel of the invention is prone to being degraded within an organism within a short time, such as within 5, 10, 30, 60, or 100 days. Biodegradation is mediated by the action of cells and enzymes found within the organism in which the biodegradable material is implanted, and results in the chemical breakdown of the material into smaller molecules and their eventual removal from the organism.

One aspect of the invention is a biocompatible and preferably biodegradable hydrogel of tunable conductivity. The hydrogel includes a biocompatible polymer conjugated to an ionic constituent of a bio-ionic liquid via a linker. The linker is a chemical moiety that covalently binds the constituent of a bio-organic liquid to the biocompatible polymer and is biocompatible and preferably biodegradable. Suitable linkers include diacrylates, disulfides, and esters.

Embodiments of the above hydrogel can include one or more of the following features. The ionic constituent of a bio-ionic liquid can be, for example, choline or another quaternary amine. In certain embodiments, the ionic constituent is another cationic constituent of a bio-ionic liquid. In certain embodiments, the ionic constituent is an anionic constituent of a bio-ionic liquid. The polymer can be any biocompatible polymer, such as a polymer found in a living organism, from which a conjugate is formed by the covalent attachment of an ionic constituent of a bio-organic liquid through a linker moiety. For example, the polymer can be gelatin, elastin, one or more elastin-like polypeptides (ELP), collagen (any type of collagen or a mixture thereof), hyaluronic acid (HA), alginate, poly(glycerol sebacate) (PGS), or poly(ethylene glycol) (PEG). In one embodiment, the conductivity of the hydrogel is at least about $3.0 \times 10^{-5}$ siemens/meter (S/m). For example, the conductivity of the hydrogel can be from about $3.0 \times 10^{-5}$ S/m to about $1.3 \times 10^{-2}$ S/m. The ratio of the polymer to the ionic constituent can range, for example, from 100:0 to 1:4 by weight; i.e., the weight percentage of the ionic constituent of a bio-ionic liquid can range from 0 (or a small value>0, e.g., 0.1) to about 80. The conjugated polymer can be present at, for example, from 10% to 20% of the weight of the hydrogel, or from 11% to 20%, or 12% to 20%, or 15% to 20%, or about 10%, about 11%, about 12%, about 13%, about 14%, about 15%, about 16%, about 17%, about 18%, about 19%, or about 20% (all wt %). Alternatively, the conjugated polymer can be present at from about 20 wt % to about 80 wt % of the hydrogel. Additionally, the conductivity may be tuned by changing the ratio of the polymer to the ionic constituent of the Bio-IL. The conductivity may be tuned also by changing the percent weight of the total polymer in the hydrogel. In one embodiment, the compressive modulus of the hydrogel is between $0.60 \pm 0.20$ kPa and $178.13 \pm 3.48$ kPa. In one embodiment, the Young's modulus of the hydrogel is between 5.4 kPa and $100.77 \pm 3.48$ kPa. The compressive modulus and the Young's modulus of the hydrogel may be tuned by changing the ratio of the polymer to the Bio-IL. The compressive modulus and the Young's modulus of the hydrogel may be tuned also by changing the percent weight of the total polymer in the hydrogel. The porosity and the swellability of the hydrogel may be tuned by changing the ratio of the polymer to the Bio-IL or by changing the percent weight of the total polymer in the hydrogel. In certain embodiments, the hydrogel is capable of supporting cell proliferation, organization, and/or function of an excitable cell in both 2D cell seeding and 3D cell encapsulation. The excitable cell type, for example, can be a nerve cell, a muscle cell, a fibroblast, a preosteoblast, an endothelial cell, or a mesenchymal stem cell. In one embodiment, the muscle cell is a cardiomyocyte.

Another aspect of the invention is a temporary scaffold for cells that supports electroactive modulation of the cells, the scaffold including the hydrogel according to the above-described aspect of the invention.

Embodiments of the above scaffold can have one or more of the following features. The scaffold supports one or more of adhesion, proliferation, migration, and differentiation of the cells. These cells may be excitable cells, e.g., neurons, cardiomyocytes, fibroblasts, preosteoblasts, endothelial cells, or mesenchymal stem cells.

According to a further aspect of the invention a method of preparing a conductive hydrogel is provided. The method includes: (a) providing an ionic constituent of a Bio-IL and a polymer, (b) modifying each of the ionic constituent and the polymer to generate a modified ionic constituent and a modified polymer, respectively, and (c) reacting the modified ionic constituent with the modified polymer using light-initiated polymerization to form the hydrogel.

Embodiments of the above method can include one or more of the following features. The Bio-IL ionic constituent can be choline. The polymer can be poly(ethylene) glycol. The modified polymer can be poly(ethylene glycol) diacrylate. Alternatively, the polymer can be gelatin. The modified polymer can be gelatin acrylate (or methacrylate). The light initiated polymerization can be carried out using Eosin Y caprolactone (VC), and triethanolamine (TEOA), or Igracure (for UV) as photoinitiators. Preferably, the photoinitiator produces free radicals when exposed to ultraviolet (UV) or visible light. Examples of photoinitiators include 1-[4-(2-hydroxyethoxy)-phenyl]-2-hydroxy-2-methyl-1-propane-1-one (Irgacure 2959, BASF, Florham Park, N.J., USA), azobisisobutyronitrile, benzoyl peroxide, di-tert-butyl peroxide, 2,2-dimethoxy-2-phenylacetophenone, Eosin Y, etc. In some embodiments, the photoinitiator is 1-[4-(2-hydroxyethoxy)-phenyl]-2-hydroxy-2-methyl-1-propane-1-one. In some embodiments; the photoinitiator is Eosin Y.

In some embodiments, the visible light activated photoinitiator is selected from the group consisting of: Eosin Y, triethanolamine, vinyl caprolactam, dl-2,3-diketo-1,7,7-trimethylnorcamphane (CQ), 1-phenyl-1,2-propadione (PPD), 2,4,6-trimethylbenzoyl-diphenylphosphine oxide (TPO), bis(2,6-dichlorobenzoyl)-(4-propylphenyl)phosphine oxide (Ir819), 4,4'-bis(dimethylamino)benzophenone, 4,4'-bis(diethylamino)benzophenone, 2-chlorothioxanthen-9-one, 4-(dimethylamino)benzophenone, phenanthrenequinone, ferrocene, diphenyl(2,4,6 trimethylbenzoyl)phosphine oxide/2-hydroxy-2-methylpropiophenone (50/50 blend), dibenzosuberenone, (benzene) tricarbonylchromium, resazurin, resorufin, benzoyltrimethylgermane (IVOCERIN), derivatives thereof, and any combination thereof.

The exemplary hydrogels and methods of the present invention provide several advantages. Hydrogels with different biomechanical and electroconductive profiles can be generated by varying the polymer to Bio-IL ratio and the concentration of the total Bio-IL conjugated polymer in the hydrogel. In other words, the biomechanical and electroconductive properties of the hydrogels are tunable. Further, the engineered hydrogels are biodegradable and elicit minimal inflammatory responses.

The invention can be further summarized by the following list of embodiments.

1. A biocompatible conductive hydrogel comprising a biocompatible polymer conjugated to a first ionic constituent of a bio-ionic liquid.

2. The conductive hydrogel of embodiment 1, wherein the first ionic constituent of a bio-ionic liquid is selected from the group consisting of choline and other organic quaternary amines.

3. The conductive hydrogel of embodiment 1 or 2, wherein the biocompatible polymer is selected from the group consisting of gelatin, elastin, elastin like polypeptides (ELP), collagen, hyaluronic acid (HA), tropoelastin, chitosan, alginate, poly(glycerol sebacate) (PGS), poly(ethylene glycol) (PEG), and poly(lactic acid) (PLA).

4. The conductive hydrogel of any of the preceding embodiments, wherein the first ionic constituent is choline and the biocompatible polymer is gelatin or poly(ethylene glycol).

5. The conductive hydrogel of any of the preceding embodiments, wherein the biocompatible polymer and the first ionic constituent are conjugated via a diacrylate linker.

6. The conductive hydrogel of any of the preceding embodiments, wherein the conductivity of the hydrogel is at least about $3.0 \times 10^{-5}$ siemens/meter (S/m).

7. The conductive hydrogel of embodiment 6, wherein the conductivity of the hydrogel is from about $3.0 \times 10^{-5}$ S/m to about $1.3 \times 10^{-2}$ S/m.

8. The conductive hydrogel of any of the preceding embodiments, wherein the ratio of the biocompatible polymer to the first ionic constituent is from about 1:4 to about 4:1 on a weight basis.

9. The conductive hydrogel of any of the preceding embodiments, wherein the concentration of total polymer in the hydrogel is from about 20 wt % to about 80 wt %.

10. The conductive hydrogel of any of the preceding embodiments, wherein the compressive modulus of the hydrogel is from about 0.60 kPa to about 180 kPa.

11. The conductive hydrogel of any of the preceding embodiments, wherein the Young's modulus of the hydrogel is from about 5 kPa to about 100 kPa.

12. The conductive hydrogel of any of the preceding embodiments, wherein the compressive modulus and the Young's modulus of the hydrogel are determined at least in part by the ratio of the biocompatible polymer to the first ionic constituent.

13. The conductive hydrogel of any of the preceding embodiments, wherein the compressive modulus and the Young's modulus of the hydrogel are determined at least in part by the concentration of the conjugated polymer.

14. The conductive hydrogel of any of the preceding embodiments, wherein the porosity and the swellability of the hydrogel are determined at least in part by the ratio of the biocompatible polymer to the first ionic constituent.

15. The conductive hydrogel of any of the preceding embodiments, wherein the porosity and the swellability of the hydrogel are determined at least in part by the concentration of the conjugated polymer.

16. The conductive hydrogel of any of the preceding embodiments, wherein the hydrogel is capable of supporting cell proliferation, tissue organization, and/or a function of an excitable cell.

17. The conductive hydrogel of embodiment 16, wherein the excitable cell is a nerve cell, a muscle cell, a cardiomyocyte, a fibroblast, a preosteoblast, an endothelial cell, or a mesenchymal stem cell.

18. The conductive hydrogel of embodiment 17, wherein the excitable cell is a cardiomyocyte.

19. The conductive hydrogel of any of the preceding embodiments that is biodegradable.

20. The conductive hydrogel of any of the preceding embodiments, wherein the hydrogel further comprises a second ionic constituent of a bio-ionic liquid, the second ionic constituent having a charge opposite to that of said first ionic constituent.

21. The conductive hydrogel of embodiment 20, wherein the first ionic constituent is positively charged and the second ionic constituent is negatively charged.

22. A method of preparing a conductive hydrogel, including any of the conductive hydrogels of embodiments 1-21, the method comprising reacting an ionic component of a bio-ionic liquid with a biocompatible polymer to form the hydrogel; wherein the ionic component comprises a first functional group, the biocompatible polymer comprises two or more second functional groups, and the first and second functional groups react to form a linker that conjugates the biocompatible polymer to said ionic component.

23. The method of embodiment 22, wherein the first and second functional groups are acrylates or methacrylates, and the step of reacting comprises light-initiated polymerization.

24. The method of embodiment 23, wherein the light-initiated polymerization is carried out using a photoinitiator selected from the group consisting of Eosin Y, vinyl caprolactone (VC), and triethanolamine (TEOA).

25. The method of any of embodiments 22-24, further comprising adding the first reactive group to the ionic component and/or adding the second reactive group to the biocompatible polymer prior to the step of reacting.

26. The method of embodiment 25, wherein the first and second reactive groups are acrylates or methacrylates, and acrylate or methacrylate derivatives of the ionic component and/or biocompatible polymer are prepared.

27. The method of any of embodiments 22-26, wherein the first ionic constituent is selected from the group consisting of choline and other organic quaternary amines.

28. The method of any of embodiments 22-27, wherein the biocompatible polymer is selected from the group consisting of gelatin, elastin, elastin like polypeptides (ELP), collagen, hyaluronic acid (HA), alginate, poly(glycerol sebacate) (PGS), and poly(ethylene glycol) (PEG).

29. The method of any of embodiments 22-28, wherein gelatin methacrylate is reacted with choline acrylate.

30. A conductive hydrogel made by the method of any of embodiments 22-29.

31. A cell scaffold that enables electroactive modulation of cells bound to the scaffold, the scaffold comprising the hydrogel of any of embodiments 1-21.

32. The cell scaffold of embodiment 31, that further enables one or more of adhesion, proliferation, migration, and differentiation of the cells.

33. The cell scaffold of embodiment 31 or 32, wherein the cells are selected from the group consisting of neurons, cardiomyocytes, fibroblasts, preosteoblasts, endothelial cells, mesenchymal stem cells, and combinations thereof.

34. The cell scaffold of any of embodiments 31-33, further comprising one or more types of cells bound to the scaffold.

35. The cell scaffold of embodiment 34, wherein the bound cells are selected from the group consisting of neurons, cardiomyocytes, fibroblasts, preosteoblasts, endothelial cells, mesenchymal stem cells, and combinations thereof.

BRIEF DESCRIPTION OF THE DRAWINGS

FIG. 1A is a schematic diagram of the reaction for acrylation of Bio-IL (choline bicarbonate) to produce acrylated Bio-IL (choline acrylate). FIG. 1B is a schematic diagram of the reaction between GelMA and acrylated Bio-IL in the presence of eosin Y and visible light to form a GelMA-Bio-IL hydrogel. FIGS. 1C-1E show $^1$H-NMR spectra of choline acrylate (acrylated Bio-IL, FIG. 1C), gelatin methacrylate (FIG. 1D), and the conjugate of gelatin methacrylate and choline methacrylate (FIG. 1E; GelMA/Bio-IL hydrogel was formed by using 1% VC, 1.5% TEOA, and 0.1 mM Eosin Y at 120 sec light exposure).

FIGS. 3A and 3B are graphs showing compressive moduli of GelMA-Bio-IL and PEGDA-Bio-IL hydrogels, respectively, having varying polymer concentrations and polymer to Bio-IL ratios. FIGS. 3C and 3D are graphs showing Young's moduli of GelMA-Bio-IL and PEGDA-Bio-IL hydrogels, respectively, also having varying polymer concentrations and polymer/Bio-IL ratios. Error bars indicate standard error of the means. Asterisks indicate significance levels: =$p<0.01$ and *=$p<0.001$.

FIGS. 4A and 4B are representative scanning electron microscope (SEM) images of GelMA-Bio-IL and PEGDA-Bio-IL hydrogels, respectively, formed by using polymer to Bio-IL ratios of 100:0 (left) and 1:1 (right) at a polymer concentration of 15% (w/v). FIGS. 4C and 4D are graphs showing average pore sizes of GelMA-Bio-IL and PEGDA-Bio-IL hydrogels at varying polymer concentrations and polymer to Bio-IL ratios. FIGS. 4E and 4F are graphs showing swelling ratios of GelMA-Bio-IL and PEGDA-Bio-IL hydrogels, respectively, in DPBS (Dulbecco's phosphate buffered saline) at 4, 8, and 24 hours. FIGS. 4G and 4H are graphs showing degradation of GelMA-Bio-IL and PEGDA-Bio-IL hydrogels in DPBS supplemented with 10% FBS (fetal bovine serum) over a two-week period. Error bars indicate standard error of the means and asterisks indicate significance levels: =$p<0.01$ and *=$p<0.001$.

FIGS. 5A and 5B are representative images showing live (green) and dead (red) cardiomyocytes cultured on GelMA (control) and GelMA-Bio-IL hydrogels, respectively. The images were taken on days 1 and 5 (scale bar=200 µm). FIGS. 5C and 5D are representative images of cardiomyocytes seeded on GelMA (control) and GelMA-Bio-IL, respectively. The cells were stained with fluorescent probes on days 1 and 5 to detect actin filaments and nuclei (DAPI stain) (scale bar=200 µm). FIG. 5E is a graph showing viability levels of cardiomyocytes cultured on GelMA (control) and GelMA-Bio-IL hydrogels. Viability measurements were performed after 1, 3, and 5 days of culture. FIG. 5F is a graph showing metabolic activity levels of the cardiomyocytes in RFU (relative fluorescence intensity) obtained using the Presto-Blue assay (Life Technologies). Metabolic activities were measured at 1, 3, and 5 days after seeding the hydrogels with cardiomyocytes. FIGS. 5G and 5H are immunofluorescence images of cardiomyocytes seeded on GelMA-Bio-IL hydrogels for detecting expressions of sarcomeric α-actin and Troponin I, respectively. The immunostaining was performed on day 7 of culture (scale bar=50 µm). FIG. 5I is a graph showing beating characteristics of cardiomyocytes seeded on GelMA and GelMA-Bio-IL hydrogels over 10 days of culture (*=$p<0.05$, =$p<0.01$, *=$p<0.001$, and ****=$p<0.0001$).

FIGS. 6A-6K are a set of images and graphs showing in vivo biodegradation and biocompatibility of GelMA-Bio-IL hydrogels in a rat subcutaneous animal model. FIG. 6A is a graph showing evaluation of in vivo degradation of GelMA-Bio-IL hydrogel on days 0, 4, 14, and 28 post implantation (n=4). Degradation in vivo was measured on the basis of weight loss of the implants. FIG. 6B is a set of images of GelMA-Bio-IL hydrogels taken on days 0, 4, 14, and 28 post implantation. FIGS. 6C, 6D, and 6E are immunofluorescence images showing in vivo degradation of GelMA-Bio-IL hydrogels. The images were obtained by Hematoxylin and Eosin (H&E) staining of GelMA-Bio-IL sections after 4 days (6C), 14 days (6D), and 28 days (6E) of implantation (scale bars=500 µm). The degradation exhibits an approximately linear behavior in the first 28 days after implantation. The H&E staining shows an insignificant amount of inflammatory cells. FIGS. 6F-6K, are images showing immunohistochemical analysis of subcutaneously implanted GelMA-Bio-IL hydrogels. The images do not show any significant local lymphocyte (CD3 positive cells) infiltration at days 4 (6F), 14 (6G), and 28 (6H) (scale bars=200 µm). Significant number of macrophages (CD68 positive cells) are observed on day 4 (6I) but they were present in much reduced numbers at days 14 (6J) and 28 (6K) (scale bars=200 µm). Green, red and blue colors in images (6F) through (6K) represent GelMA-Bio-IL hydrogels, immune cells, and cell nuclei (DAPI stain).

FIGS. 7A and 7B show representative compression stress curves for GelMA-Bio-IL and PEGDA-Bio-IL hydrogels, respectively, at polymer concentrations of 10%, 15%, and 20% and a polymer to Bio-IL ratio of 80:20. FIGS. 7C and 7D show representative tensile stress curves for GelMA-Bio-IL and PEGDA-Bio-IL hydrogels, respectively, at polymer concentrations of 10%, 15%, and 20% and a polymer to Bio-IL ratio of 80:20. Error bars indicate standard error of the means. Asterisks indicate significance levels: =$p<0.01$ and *=$p<0.001$.

FIGS. 8A, 8B, and 8C are graphs showing degradation rates of GelMA-Bio-IL hydrogels having polymer concentrations of 10%, 15%, and 20%, respectively, in DPBS. FIGS. 8D, 8E, and 8F are graphs showing degradation rates of GelMA-Bio-IL hydrogels as in FIGS. 8A, 8B, and 8C, respectively, except that the hydrogels were kept in a solution containing DPBS supplemented with 10% FBS. For each of the polymer concentrations, hydrogels having four different ratios of GelMA and Bio-IL were tested. The tests were conducted over a 14 day period.

FIGS. 9A, 9B, and 9C are graphs showing degradation rates of the hydrogels having polymer concentrations of 10%, 15%, and 20%, respectively, in DPBS. FIGS. 9D, 9E, and 9F are graphs showing degradation rates of PEGDA-Bio-IL hydrogels as in FIGS. (A), (B), and (C), respectively, except that the hydrogels were kept in a solution containing DPBS supplemented with 10% FBS. For each polymer concentration, hydrogels having four different ratios of GelMA and Bio-IL were tested. The tests were conducted over a 14-day period.

DETAILED DESCRIPTION OF THE INVENTION

Figures 1A, 1B:
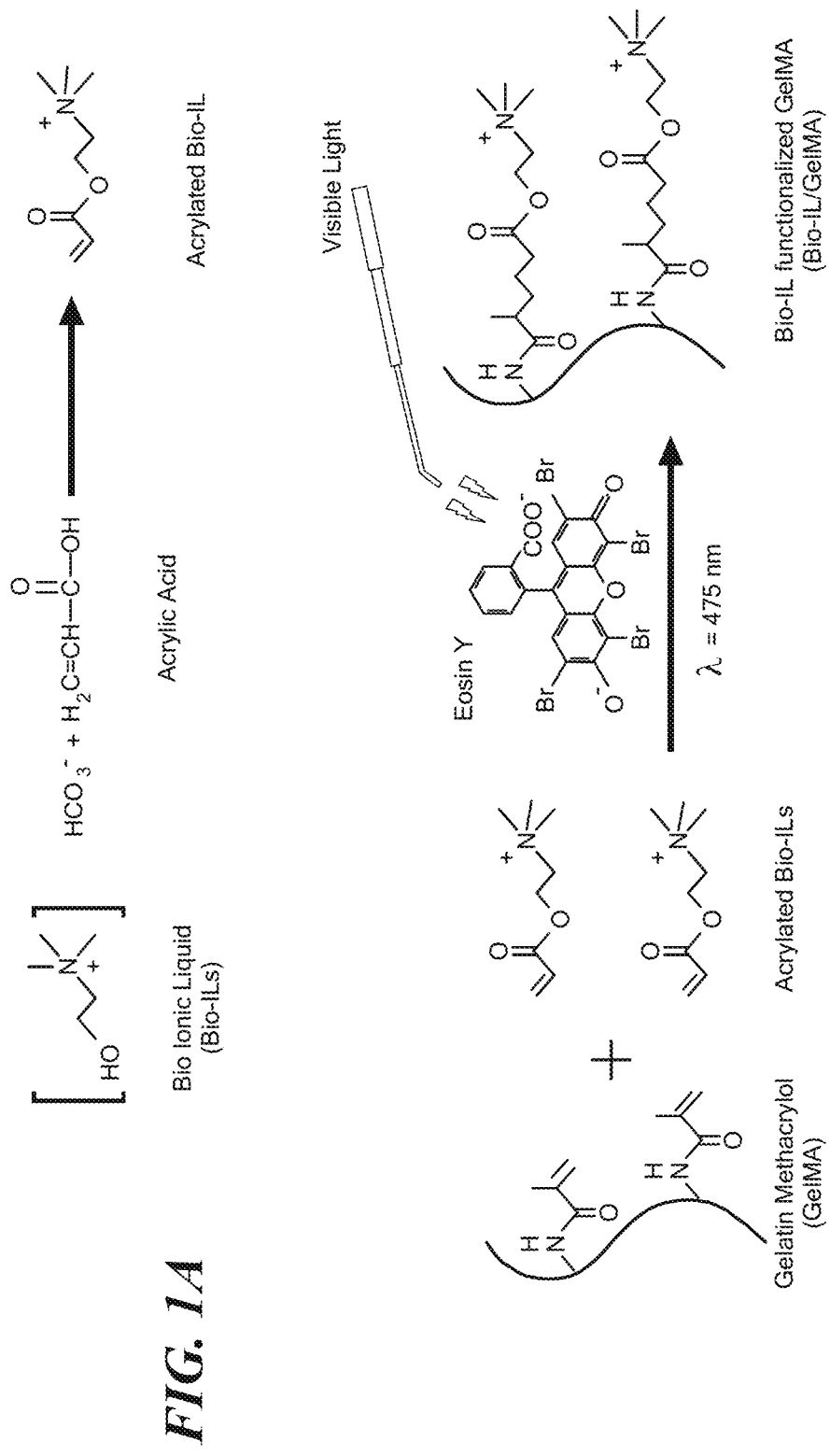
FIGS. 1A-1E are diagrams showing synthesis and characterization of Bio-IL functionalized gelatin methacrylol (GelMA) hydrogel.
Figure 1C:
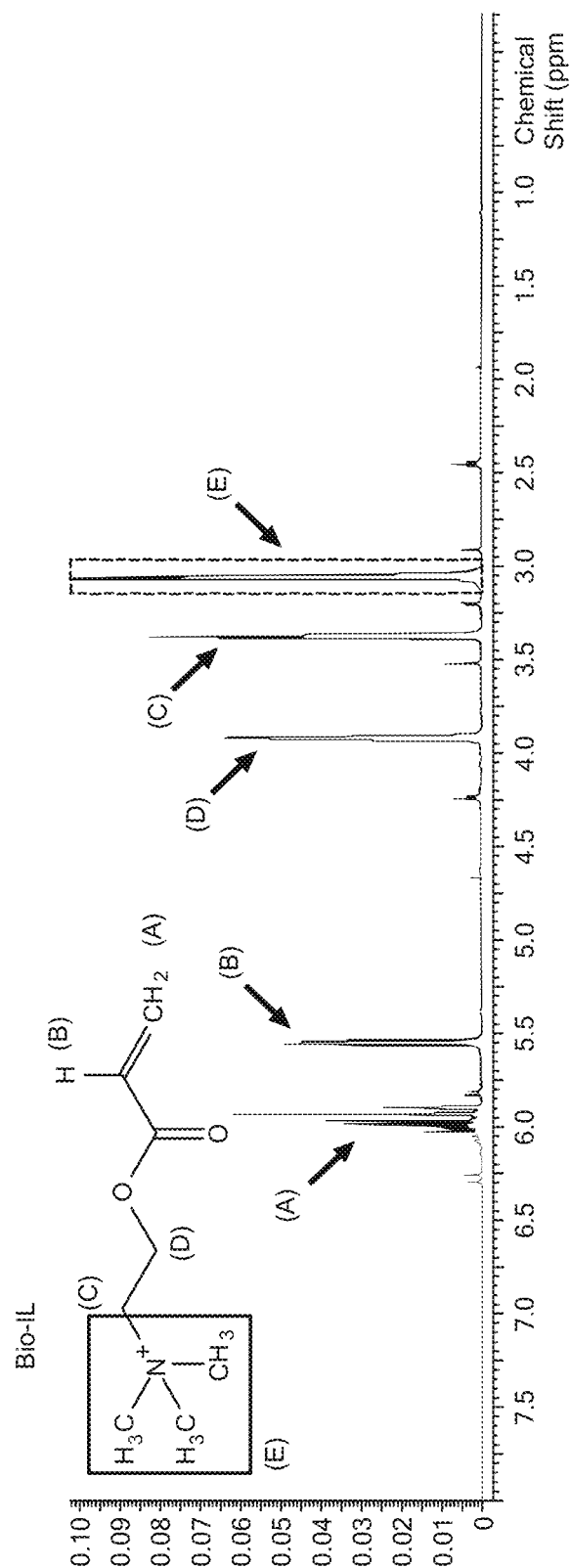

Hydrogels with electroconductive properties have potential for use as bioactive scaffolds in tissue engineering where growth and stimulation of excitable cells is required. Conductive hydrogels are also widely used in biomedical applications such as electroactive drug delivery devices, biorecognition elements for implantable biosensors, and organic coatings for neural interfaces. However, for optimal performance, implantable hydrogels should be biocompatible and biodegradable such that they may be introduced into living organisms without eliciting inflammatory responses.

The present invention is generally directed towards conductive hydrogels that are biocompatible and biodegradable and possess tunable conductivity. More specifically, the invention provides a biodegradable and biocompatible hydrogel of tunable conductivity that includes a bio-ionic liquid (Bio-IL) conjugated to a polymer. In some embodiments, the bio-ionic liquid is choline. In various embodiments, the polymers are gelatin methacrylol (GelMA) (FIG. 1B) and poly(ethylene glycol) diacrylate (PEGDA).

GelMA and PEGDA based polymer systems are intrinsically non-conductive, which limits their use in applications requiring modulation of excitable cells such as neurons and muscle cells. Incorporation of Bio-IL into the polymer network provided tunable electroconductive properties to the Bio-IL conjugated hydrogels (engineered scaffolds). Conductive hydrogels according to the present disclosure have a conductivity of at least $3.0 \times 10^{-5}$ siemens/meter (S/m). In one embodiment, the conductivity is as high as $1.3 \times 10^{-2}$ S/m.

Hydrogels according to the present disclosure may be made with varying ratios of polymer to Bio-IL. In various embodiments, the ratio of polymer to Bio-IL is from about 100:0 to about 20:80. Moreover, the conjugated polymer may be present at 10% to 20% of the weight of the hydrogel.

Changing the ratio of the polymer to the Bio-IL or changing the percent weight of the conjugated polymer in the hydrogel alters the conductivity of the hydrogel, thereby, providing a way of tuning its conductivity.

Conductivity of the hydrogels was found to change also with the stretch force applied to them. Measurements showed that conductivity did not change significantly with increase in length due to stretching. See FIG. 2D.

Hydrogels used in biomedical applications must provide adequate mechanical support to cells and tissues. They should be effective also in transducing physicochemical cues to the cells and tissues given that different mechanical cues are known to modulate key cellular functions such as cell proliferation, differentiation, migration, and apoptosis (Chicurel, M. E. et al., 1998, *Curr Opin Cell Biol*, 10, 232). Therefore, in order to reproduce the mechanical features of native tissues it is desirable that the engineered biomaterials have tunable physical properties.

Mechanical characterization of the hydrogels discloses herein revealed that their stiffness could be modulated by varying the concentration of the total polymer in the hydrogel as well as by varying the polymer to Bio-IL ratio. Without intending to be limited by any theory or mechanism of action, this dependence could be explained in part by the presence of a greater number of available crosslinking sites at higher polymer concentrations (Kloxin, A. M. et al., 2010, *Advanced Materials*, 22, 3484), which would lead to a higher degree of crosslinking. The ability to engineer hydrogels of varying stiffness can be advantageous in certain biomedical applications. In one embodiment, the compressive modulus of the hydrogel described in the present disclosure ranges between 0.60±0.20 kPa and 178.13±3.48 kPa. On the other hand, the Young's modulus ranges between 5.4 kPa and 100.77±3.48 kPa.

Further, both the compressive modulus and the Young's modulus of the hydrogel may be tuned by changing the polymer to Bio-IL ratio. Both parameters may be tuned also by changing the percent weight of the conjugated polymer.

The porosity of hydrogels plays a major role in the modulation of cell and tissue interactions as well as in the penetration of cells into the scaffold in 2D culture and 3D encapsulation (Annabi, N. et al., 2010, *Tissue Eng* Part B Rev, 16, 371). Scaffolds with higher porosity are desirable for tissue engineering as they are better penetrated by cells and, as such, favor formation of new tissue within the 3D structure of the scaffold. Hydrogels with tunable porosity, therefore, are useful for generating cell-laden scaffolds with different spatial distributions (Annabi, N. et al., 2010, *Tissue Eng* Part B Rev, 16, 371; Zeltinger, J. et al., 2001, *Tissue Eng*, 7, 557). In the hydrogels described in the present disclosure, porosity and swellability can be tuned by changing the ratio of the polymer to the bio-ionic liquid. The porosity and the swellability of the hydrogel can be tuned also by changing the percent weight of the conjugated polymer.

The hydrogels described here are also capable of supporting proliferation, organization, and function of excitable cells. Excitable cells include nerve cells, muscle cells (e.g., cardiomyocytes), fibroblasts, preosteoblasts, endothelial cells mesenchymal stem cells and some endocrine cells (e.g., insulin producing pancreatic β cells).

Without further elaboration, it is believed that one skilled in the art can, based on the description above, utilize the present invention to its fullest extent. The specific examples below are to be construed as merely illustrative and not limitative of the remainder of the disclosure in any way whatsoever.

EXAMPLES

Example 1: Experimental Procedures

Preparation of hydrogels and the various measurements described in examples 2-7 below were carried out according to the procedures described below:

Synthesis of Conductive Hydrogels:

Seventy microliters of a prepolymer mixture containing gelatin methacroyl and acrylated choline (GelMA/Bio-IL) in triethanolamine (TEOA) and N-vinylcaprolactam (VC) were injected into polydimethylsiloxane (PDMS) molds and exposed to visible light (450 nm) for 120 seconds. The PDMS material contained rectangular (w: 5 mm, ℓ: 12 mm, d: 1.25 mm) and cylinder-shaped molds (d: 5.5 mm, h: 4 mm) for conducting tensile and compression tests, respectively. Samples were removed from the molds and placed in DPBS for 2 hours at room temperature. Hydrogels were blotted dry and measurements for swelling made using digital calipers before positioning them in an Instron 5542 mechanical tester with a 10 N load cell. Compression was performed at 1 mm/min of speed until failure occurred. Compression modulus was calculated as the slope of the initial linear region at the stress-strain curve obtained by plotting the results of compressions.

For tensile test, hydrogels were formed into rectangular shapes and fixed to fine adhesive tape. Each end of the adhesive tape was attached to the Instron and the sample was stretched at a rate of 2 mm/min until failure occurred. Elastic moduli were calculated by obtaining the slope of the stress-strain curves.

Evaluation of Electrical Conductivity

Hydrogels produced by using various ratios of polymer to Bio-IL as well as different polymer concentration were formed in a 70 μL rectangular PDMS mold and allowed to sit for 24 hours. Once dried, conductivity analysis was performed using a two-probe electrical station connected to a Hewlett Packard (HP) 4155A Semiconductor Parameter analyzer. Each hydrogel was measured and placed in a relaxed state where the two probes penetrated the hydrogels—one at each end (FIG. 2C). The analyzer was set to measure current in the presence of an electrical stimulation ranging from −5 to 5 volts. Results were analyzed to determine conductivity values.

In Vitro Degradation Test

Freeze-dried samples of hydrogels were weighed and placed in a 24 well plate with 1 ml of DPBS or DPBS supplemented with 10% FBS at 37° C. in a humidified oven for 2 weeks. The DPBS/FBS solutions in the plate were replaced with fresh solutions every three days to maintain constant enzyme activity. At prearranged time points (after 1, 7, and 14 days), the samples were removed from the DPBS/FBS solutions, freeze-dried and weighed. Percentage degradation (D %) of the hydrogels was calculated using Equation (1):

$$D\% = \frac{W_i - W_t}{W_i} \times 100\%, \quad (1)$$

where $W_i$ is the initial dry weight of the sample and $W_t$ is the dry weight after time t.

Swelling Ratio Measurements

The equilibrium swelling ratio of GelMA-Bio-IL and PEGDA-Bio-IL hydrogels were evaluated. For this purpose, cylinder-shaped hydrogels were prepared (7 Mm in diameter, 2 mm in depth). Prepared hydrogels were washed three times with DPBS. Next, they were lyophilized and weighed in dried condition. Thereafter, the samples were immersed in DPBS at 37° C. for 4, 8, and 24 hours and weighed again after immersion. The swelling ratio and water uptake capacity of the samples were calculated as the ratio of the swelled sample mass to the mass of the lyopholized sample.

SEM Analysis

SEM analysis was performed to evaluate the porosity of engineered GelMA-Bio-IL and PEGDA-Bio-IL hydrogels. Samples were prepared by a procedure similar to that described for the swelling ratio test. The freeze dried samples were coated with palladium prior to analysis. SEM images were acquired by using a FEI/Phillips XL30 FEG SEM (10 kV). Pore size analysis of the GelMA-Bio-IL hydrogels was performed by measuring the pore sizes of at least three images of the samples (n=50) using ImageJ software.

Primary Cardiomyocyte Isolation:

All animal experiments were reviewed and approved by the Institutional Animal Care and Use Committee (ICAUC; protocols 15-0521R and 15-1248R) at Northeastern University (Boston, Mass., USA). Primary rat cardiomyocytes were isolated from 2-days-old neonatal Sprague Dawley pups according to the protocol approved by the ICAUC at Northeastern University. Briefly, pups were quickly decapitated with scissors after disinfecting the neck and sternum with 70% ethanol. A vertical incision was made across the sternum to excise the heart, which was placed in cold Hank's Balanced Salt Solution (HBSS) buffer. The atria and blood vessels were carefully removed and each heart was quartered and incubated overnight in a solution of 0.05% trypsin (w/v) in HBSS at 4° C. Trypsin digestion was stopped by adding culture media, followed by shaking for 5 min at 37° C. in a water bath. The tissues were then serially digested in 0.1% collagenase type II solution in HBSS (10 min shaking incubation at 37° C.). The collagenase solution containing the cardiomyocytes was centrifuged at 500×g for 5 min. Primary cells were resuspended in DMEM supplemented with 10% FBS and preplated for 1 h to enrich for cardiomyocytes.

Surface Seeding (2D Culture)

Scaffolds were formed by placing a 7 μL drop of hydrogel precursor mixture confined within 150-μm spacers and covered by glass slides coated with 3-(trimethoxysilyl) propyl methacrylate (TMSPMA, Sigma-Aldrich). Hydrogel precursors were then photocrosslinked for 20 seconds using a Genzime FocalSeal LS100 xenon light source. Primary rat cardiomyocytes ($7.5 \times 10^5$ cells/scaffold) were seeded on the surface of the hydrogels and placed on 24 well plates with 400 μL of growth medium (DMEM supplemented with 10% fetal bovine serum (FBS, Invitrogen) and 1% penicillin/streptomycin (Invitrogen)). 2D cultures were maintained at 37° C. in a humidified 5% $CO_2$ atmosphere and culture medium replaced every 48 hours.

Three-Dimensional (3D) Cell Encapsulation:

For 3D cell encapsulation, precursor hydrogel solutions were prepared in cell culture medium containing TEA (1.8% w/v) and VC (1.25% w/v), and gently mixed with cells (10×106 cells/ml). A single 7 μl drop of this mixture was pipetted on a 150 μm spacer, and covered by a TMSPMA-coated glass slide. After photocrosslinking, the hydrogels were washed several times with warm medium to remove the unreacted photoinitiators. The cell-laden gels were then placed in 24 well plates and incubated at 37° C., 5% $CO_2$, and humidified atmosphere.

Cell Viability and Metabolic Assays

Cell viability of primary cardiomyocytess growing on the surface of GelMA and GelMA-Bio-IL hydrogels was evaluated using a commercial live/dead cell viability kit (Invitrogen) according to instructions from the manufacturer. Briefly, cells were stained with 0.5 μL/mL of calcein AM and 2 μL/mL of ethidium homodimer-1 (EthD-1) in DPBS for 15 min at 37° C. Fluorescent image acquisition was carried out at days 1, 4, and 7 post-seeding using an AxioObserver Z1 inverted microscope (Zeiss). Viable cells appeared green and apoptotic/dead cells appeared red. The number of live and dead cells was quantified using the ImageJ software. Cell viability was determined as the number of live cells divided by the total number of live and dead cells.

Metabolic activity was evaluated at days 1, 3, and 5 post-seeding using the PrestoBlue assay (Life Technologies) according to manufacturer's instructions. Briefly, 2D cultures of primary cardiomyocytes were incubated in 400 μL of growth medium with 10% PrestoBlue reagent for 2 h at 37° C. Resulting fluorescence was measured (excitation 530 nm; emission 590 nm) using a Synergy HT fluorescence plate reader (BioTek). Control wells without cells were used to determine background fluorescence for all experiments.

Cell Adhesion, Proliferation and Spreading:

Cell spreading on the surface of engineered hybrid hydrogels was visualized through fluorescent staining of F-actin filaments and cell nuclei from primary cardiomyocytes. Briefly, 2D cultures at days 1, 4, and 7 post-seeding were fixed in 4% (v/v) paraformaldehyde (Sigma) for 15 min, permeabilized in 0.1% (w/v) Triton X-100 (Sigma) for 5 min, and then blocked in 1% (w/v) bovine serum albumin (BSA, Sigma) for 30 min. Samples were next incubated with Alexa-fluor 488-labeled rhodamine-phalloidin (1:40 dilution in 0.1% BSA, Invitrogen) for 45 min. After three consecutive washes with DPBS, samples were counterstained with 1 μL/mL DAPI (4',6-diamidino-2-phenylindole, Sigma) in DPBS for 5 min. Fluorescent image acquisition was carried out using an AxioObserver Z1 inverted microscope. Cell density, confluency, and cell spreading were calculated from fluorescence images using the ImageJ software. Cell density was determined as the number of cell nuclei per given area, and confluency was determined as the total area occupied by F-actin filaments per given area.

In Vivo Biodegradation and Biocompatibility

Male Wistar rats (200-250 grams) were obtained from Charles River (Boston, Mass., USA) and housed in the local animal care facility under conditions of circadian day-night rhythm and feeding ad libitum. 2.0 to 2.5% isoflurane inhalation followed by 0.02 to 0.05 mg/kg SC buprenorphine administration were used to anesthetize the rats. After inducing anesthesia, eight 1-cm incisions were made on the posterior medio-dorsal skin and small lateral subcutaneous pockets were prepared by blunt dissection around the incisions. GelMA-Bio-IL hydrogels (1×5 mm disks) were implanted into the pockets followed by anatomical wound closure and recovery from anesthesia. Animals were euthanized by anesthesia/exsanguination at days 4, 14, and 28 post-implantation, after which the samples were retrieved with the associated tissue and placed in DPBS.

Histological Analysis and Immunofluorescent Staining

Histological analyses were performed on cryosections of explanted hydrogel samples in order to characterize the inflammatory response elicited by the implanted material. After explantation, samples were fixed in 4% paraformaldehyde for 4 hours, followed by overnight incubation in 30% sucrose at 4° C. Samples were then embedded in Optimal Cutting Temperature compound (OCT) and flash frozen in liquid nitrogen. Frozen samples were then sectioned using a Leica Biosystems CM3050 S Research Cryostat. 15-μm cryosections were obtained and mounted in positively charged slides using DPX mountant medium (Sigma). The slides were processed for hematoxylin and eosin staining (Sigma) according to instructions from the manufacturer. Immunohistofluorescence staining was performed on mounted cryosections as previously reported (Annabi, N. et al., 2016, *Adv Mater*, 28, 40). Anti-CD3, anti-osterix (SP7) (ab16669), and anti-CD68 (ab125212) (Abcam) were used as primary antibodies. An Alexa Fluor 488-conjugated secondary antibody (Invitrogen) was used for detection. All sections were counterstained with DAPI (Invitrogen) and visualized on an Axioobserver Z1 inverted microscope (Zeiss).

Immunocytofluorescence staining was performed on 2D cultures of primary cardiomyocytess to evaluate the expression of the cardiac differentiation marker sarcomeric α-actinin. Briefly, 2D cultures growing on the surface of GelMA and GelMA-Bio-IL hydrogels were fixed in 4% paraformaldehyde for 1 h at room temperature at day 7 post-seeding. Samples were washed three times with DPBS, permeabilized in 0.1% (w/v) Triton X-100 for 30 min, and blocked in 10% (v/v) goat serum in PBS containing 0.1% Triton x-100 for 1 h. Samples were incubated overnight with an anti-sarcomeric α-actinin primary antibody (1:200 dilution) in 10% (v/v) goat serum at 4° C. After incubation, samples were washed three times with DPBS and incubated for 2 h at room temperature with an Alexa Fluor 488-conjugated secondary antibody diluted in 10% (v/v) goat serum (1:200 dilution). Lastly, the samples were washed three times with DPBS and counterstained with DAPI (1/1000 dilution in DPBS) for 5 min at room temperature. Image acquisition was performed using an AxioObserver Z1 inverted microscope.

Statistical Analysis

Data analysis was carried out using a 2-way ANOVA test with the GraphPad Prism 6.0 software.

Example 2: Preparation of Bio-IL Conjugated (Hybrid) Hydrogels

A versatile method for preparing Bio-IL conjugated hydrogels was developed. The method requires conjugating choline based Bio-ILs with natural and synthetic polymers to yield new biodegradable and conductive biomaterials (see FIGS. 1A-1E).

Gelatin methacryloyl was synthesized as previously described (Nichol, J. et al., 2010, *Biomaterials*, 31, 5536), Choline acrylate was synthesized by reacting choline bicarbonate with acrylic acid. See FIG. 1A. Different ratios of GelMA and acrylated were mixed at room temperature. The resulting GelMA/Bio-IL prepolymer was then crosslinked into a hydrogel via visible-light initiated photopolymerization, using Eosin Y, vinyl caprolactone (VC), and triethanolamine (TEOA) (FIG. 1B). Composite hydrogels were synthesized using 100/0 (control), 80/20, 50/50 and 20/80 polymer/Bio-IL ratios, as well as 10%, 15% and 20% (w/v) final polymer concentrations.

Figure 1D:
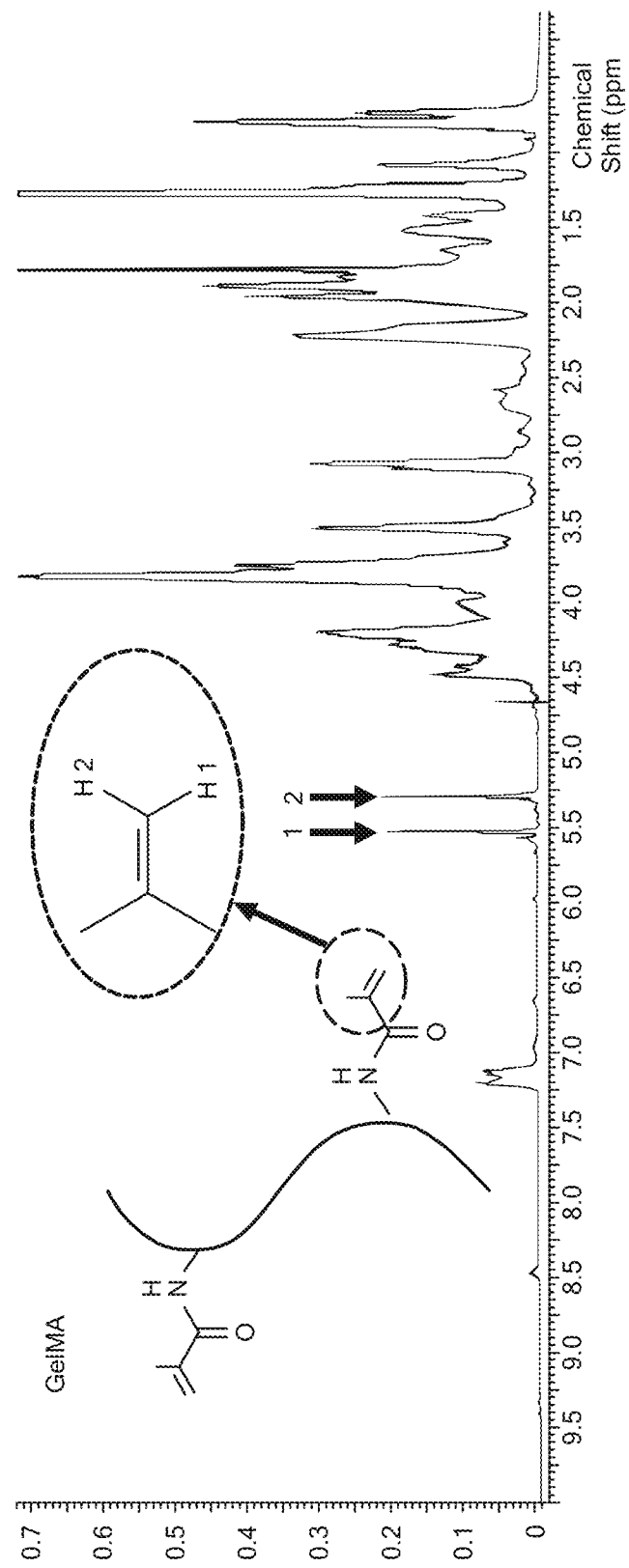
Figure 1E:
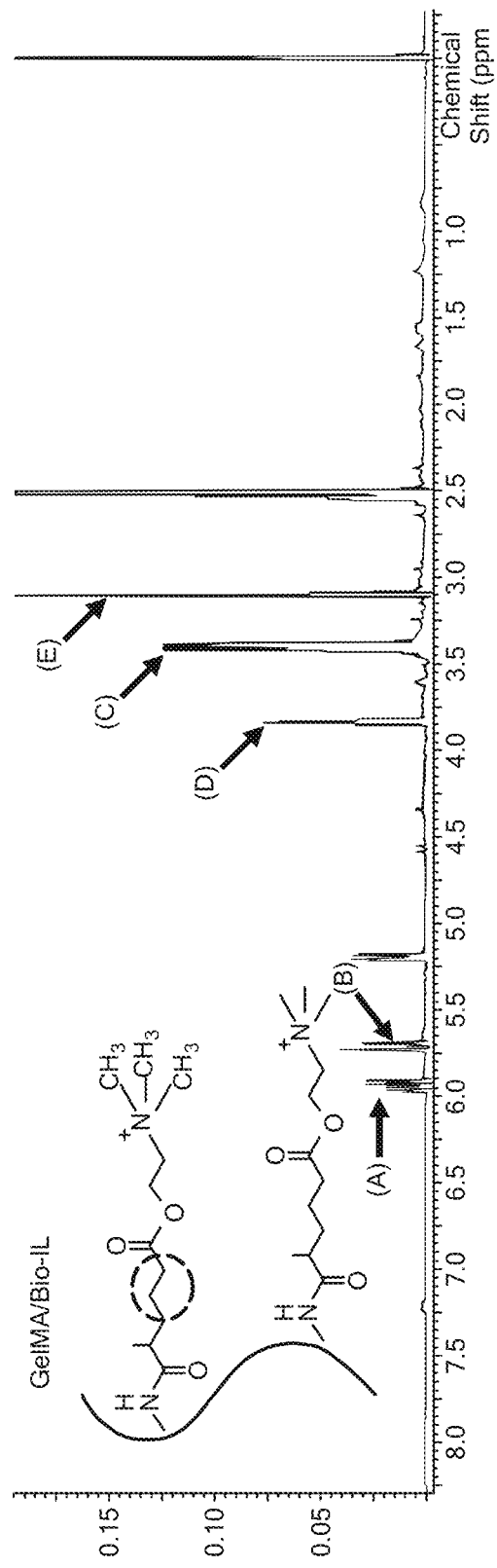
Figure 10A:
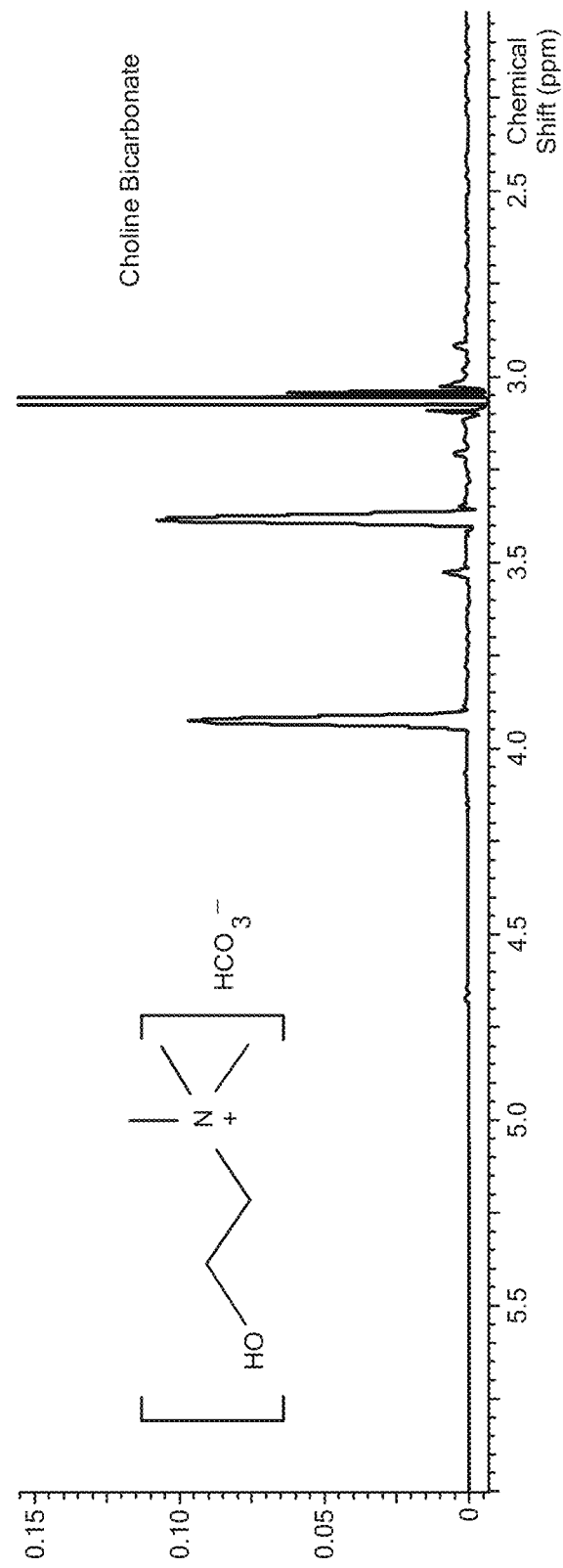
FIG. 10A is an $^1$H NMR spectrum of choline bicarbonate.
Figure 10B:
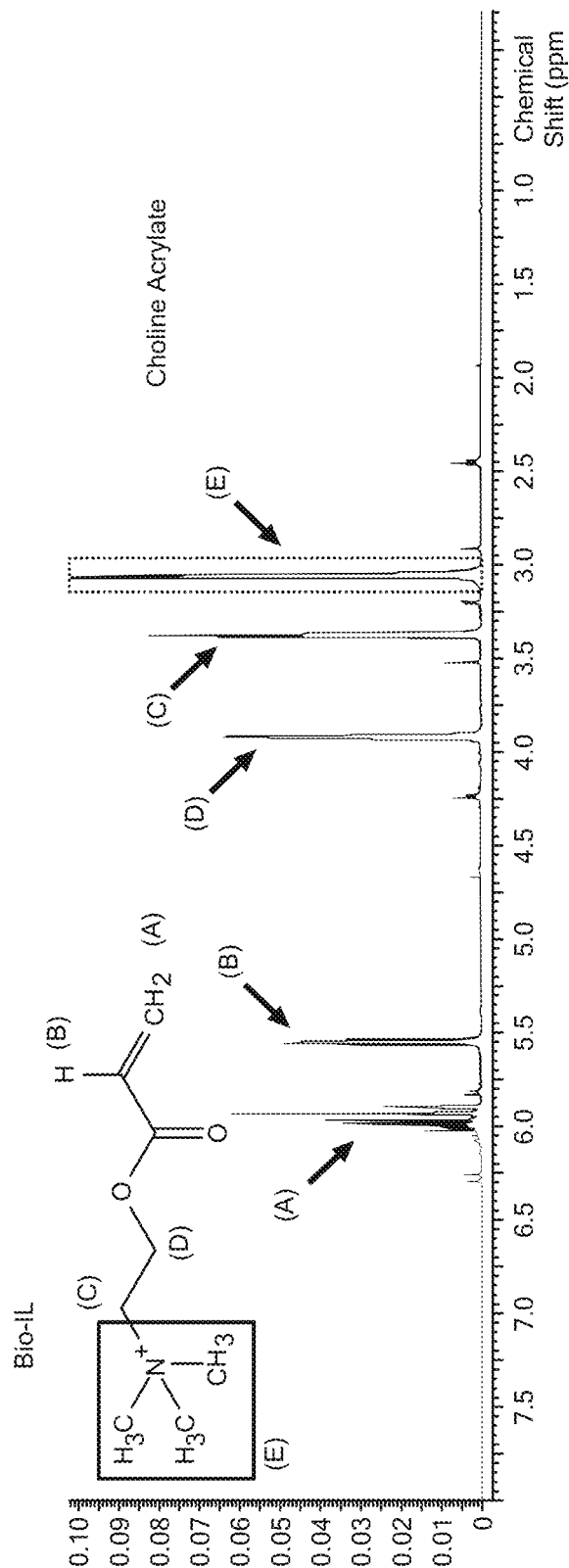
FIG. 10B is an NMR spectrum of choline acrylate synthesized by reacting choline bicarbonate and acrylic acid at 50° C. for 5 h. The presence of peaks at δ=5.8 ppm to 6.1 ppm confirmed the acrylation of choline.

The acrylation of choline bicarbonate was confirmed by comparing the NMR spectra of choline bicarbonate with that of the choline acrylate (Bio-IL) as shown in FIG. 10A. The appearance of a peak related to the hydrogen atoms in the acrylate groups at δ=5.8-6.1 ppm was indicative of the acrylation of the Bio-IL (FIG. 10B). In addition, the $^1$H NMR spectra were collected for GelMA (FIG. 1D), and GelMA/Bio-IL conjugate (FIG. 1E) to confirm the conjugation of Bio-IL to GelMA. The decay of the C=C double bonds from the GelMA methacrylate groups was calculated using Equation 1 during the free-radical polymerization that occurred after exposure to visible light (FIGS. 1D and 1E). It was determined that 94.1±4.6% of the methacrylate groups in GelMA and GelMA/Bio-IL underwent decay after photocrosslinking. Similarly, 57.4±4.3% of the peak area related to C=C double bonds of the acrylate groups also underwent decay. This is indicative of the conjugation of the Bio-IL to GelMA (FIG. 1E). This was further confirmed by the appearance of a sharp peak at δ=3.1-3.2 ppm, which corresponded to the three hydrogen atoms of choline (ammonium ion) (FIG. 1E). This peak was absent in the GelMA spectrum (FIG. 1D), but it was observed in both the Bio-IL (FIG. 1C) and the composite GelMA/Bio-IL hydrogel (FIG. 1E).

Example 3: Electrical Conductivity of Bio-Ionic Liquid Conjugated Hydrogels

Figure 2A:
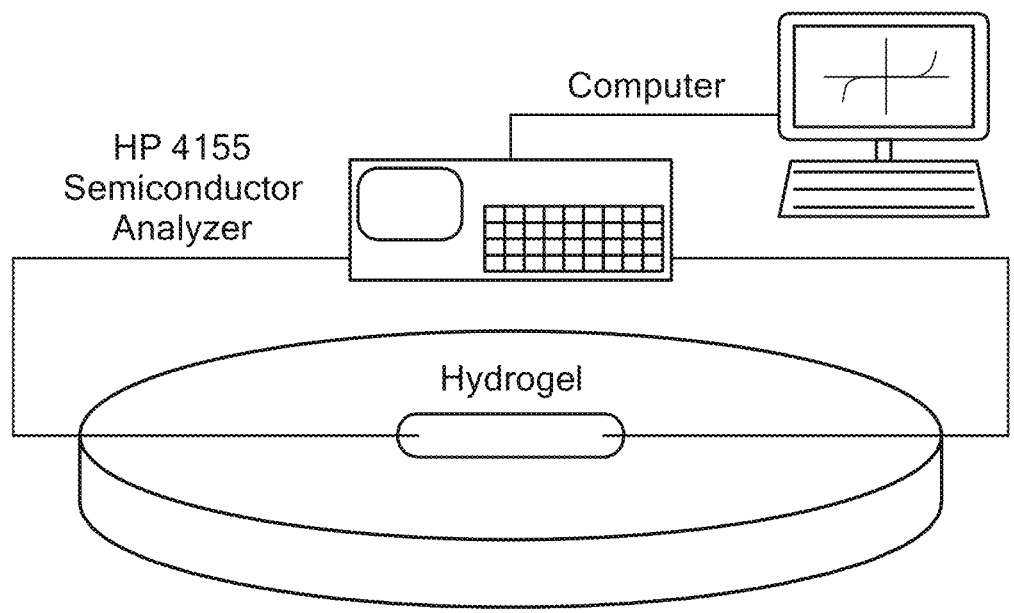
FIG. 2A is a diagram showing the experimental setup of a two-probe electrical station used to measure electrical conductivity of the engineered GelMA-Bio-IL hydrogels.
Figure 2B:
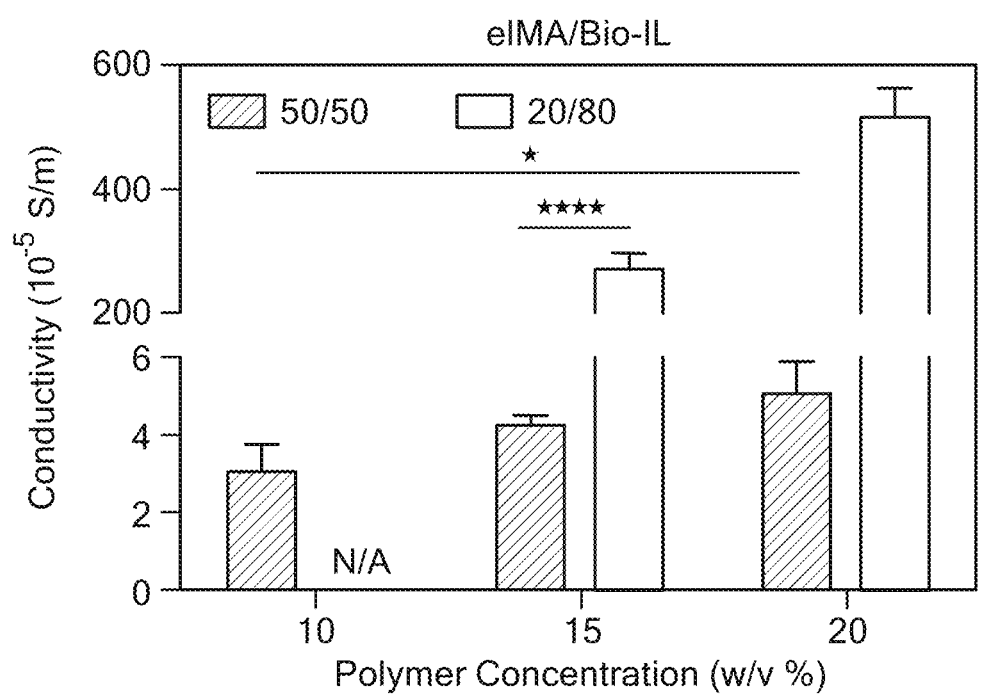
FIGS. 2B and 2C are graphs showing measurements of conductivities of Bio-IL-conjugated GelMA and PEGDA polymers, respectively, at different polymer concentrations and polymer to Bio-IL ratios.
Figure 2C:
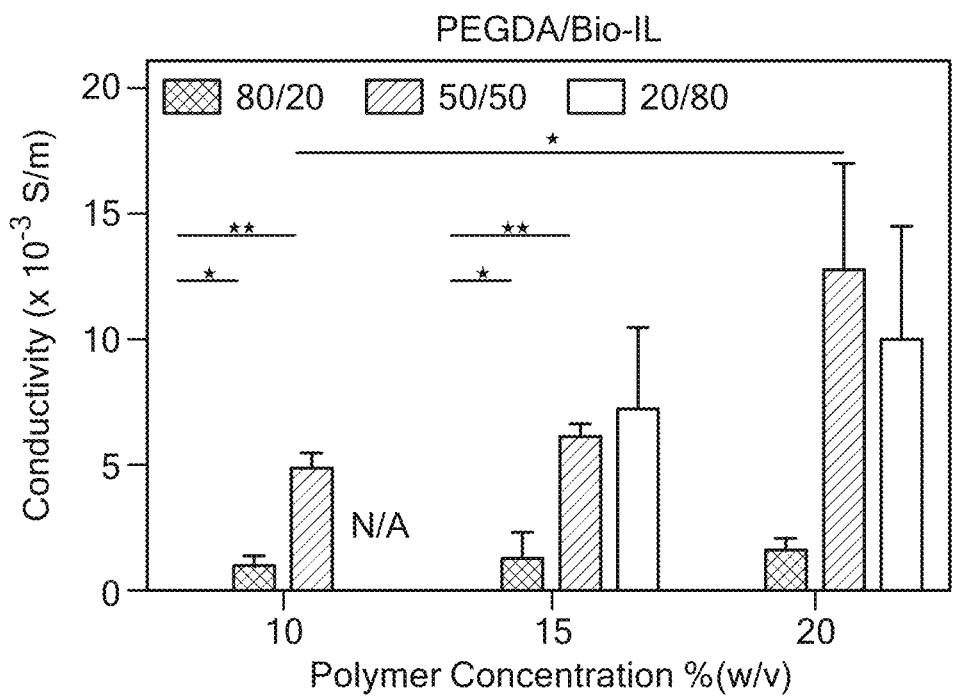

The conductivity of GelMA-Bio-IL hydrogels at 10% final polymer concentration and 1:1 polymer to Bio-IL ratio was measured to be approximately $3.03 \times 10^{-05}$ S/m (see FIG. 2B). For GelMA-Bio-IL hydrogels at 15% CPC, the conductivity was observed to be $4.27 \times 10^{-05}$ S/m and $2.72 \times 10^{-3}$ S/m, at 1:1 and 1:4 polymer to Bio-IL ratios, respectively. Lastly, GelMA-Bio-IL hydrogels at 20% total polymer concentration exhibited conductivities of $5.03 \times 10^{-5}$ S/m and $5.17 \times 10^{-3}$ S/m at 1:1 and 1:4 polymer to Bio-IL ratios, respectively.

On the other hand, PEGDA-Bio-IL hydrogels at 10% final polymer concentration exhibited conductivities of 9.32×

$10^{-4}$ S/m and $4.86 \times 10^{-3}$ S/m at polymer to Bio-IL ratios of 4:1 and 1:1, respectively (see FIG. 2C). For 15% polymer concentration, the conductivities of PEGDA/Bio-IL hydrogels were calculated to be $1.45 \times 10^{-3}$ S/m, $6.08 \times 10^{-3}$ S/m, and $7.11 \times 10^{-3}$ S/m at polymer to Bio-IL ratios of 4:1, 1:1, and 1:4, respectively. Finally, PEGDA/Bio-IL hydrogels at 20% polymer concentration exhibited conductivities of $1.48 \times 10^{-3}$ S/m, $1.26 \times 10^{-2}$ S/m, and $9.83 \times 10^{-3}$ S/m at polymer to Bio-IL ratios of 4:1, 1:1, and 1:4 respectively.

Figure 2D:
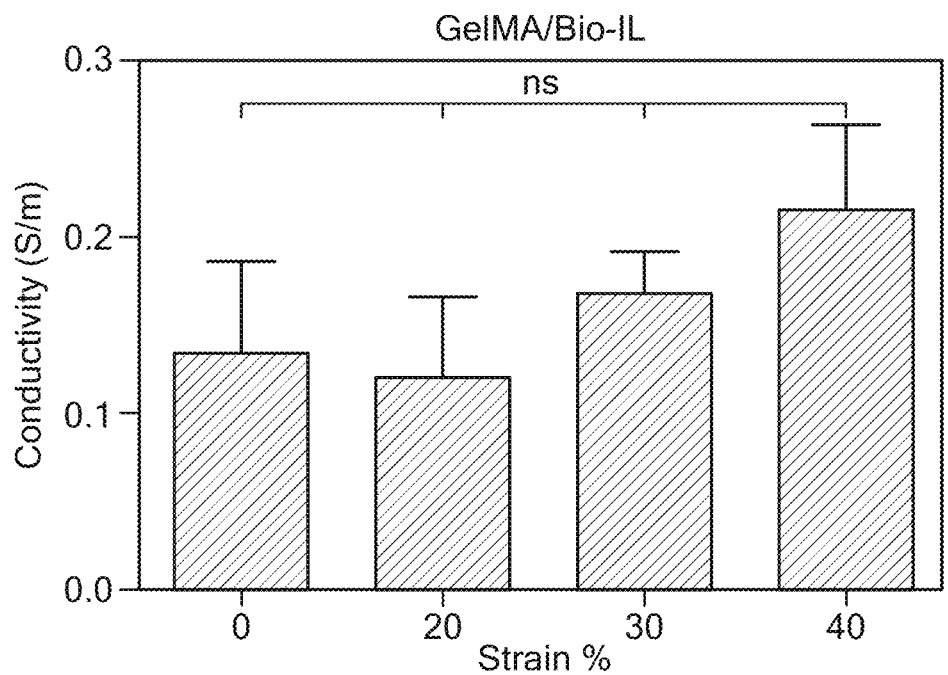
FIG. 2D is a graph showing electrical conductivity measurements of GelMA-Bio-IL hybrid hydrogels at 20%, 30%, and 40% stretch. Each hydrogel has a polymer concentration of 15% and a polymer to Bio-IL ratio of 50:50.
Figure 2E:
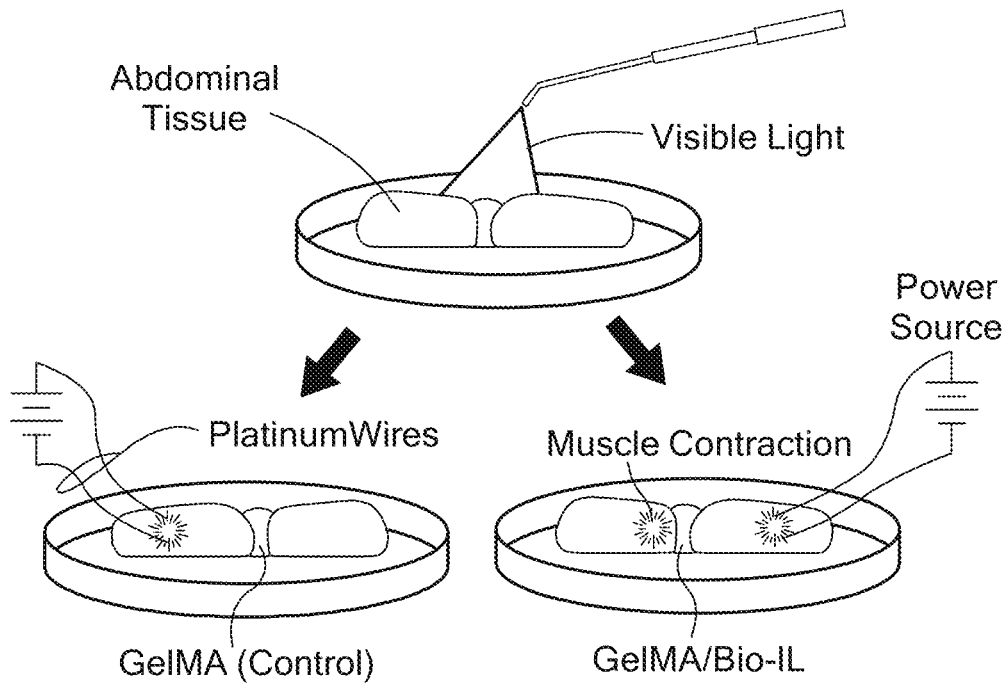
FIG. 2E is a schematic diagram of ex vivo studies performed using rat abdominal muscle tissues connected using a GelMA:Bio-IL hydrogel having a final polymer concentration of 15% and a GelMA:Bio-IL ratio of 50:50 (bottom right) and pure GelMA hydrogel (bottom left).
Figure 2F:
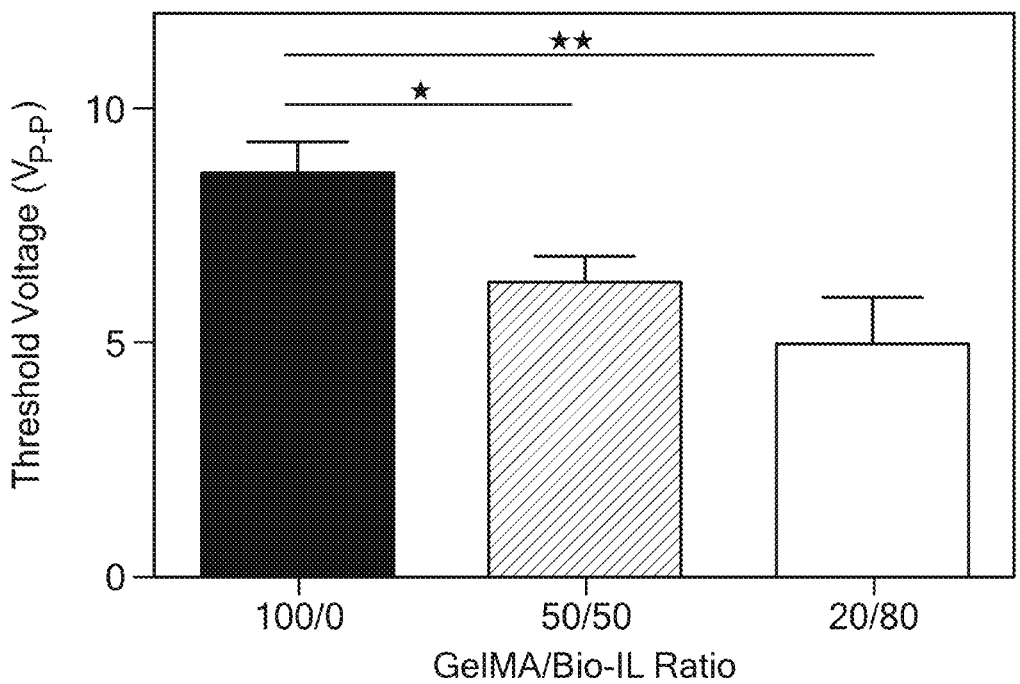
FIG. 2F is a graph showing threshold voltages at which contraction was achieved using GelMA:Bio-IL hydrogels having a final polymer concentration of 15% and GelMA:Bio-IL ratios of 50:50 and 20:80 ratios as well as using pure GelMA hydrogels having a final polymer concentration of 15%.

Given the elastic nature of hydrogels, conductivity was also evaluated under stretched conditions. The engineering of elastic and conductive materials that retain their electrical properties under substantial stretch and bending, still constitutes a major technical challenge. Therefore, the conductivity of the Bio-IL-conjugated hydrogels was investigated at different levels of stretching. GelMA/Bio-IL hydrogels were dried for 2 h to retain trace amounts of moisture, and maintain their flexibility. The samples were then stretched, and the conductivity was measured at different strains, using a two probe electrical station. The results showed that there were no statistically significant differences between the conductivity of hydrogels at different levels of stretching (see FIG. 2C). In contrast, alternative methods to engineer ECHs, such as the incorporation of dispersed metallic nanoparticles, often suffer from a rapid and nonlinear decrease in conductivity during stretching The ability of Bio-IL conjugated hydrogels to propagate electrical stimuli and restore synchronous contraction in severed skeletal muscle ex vivo was also studied. A schematic diagram of the experimental set up used for this purpose is shown in FIG. 2E. Briefly, the rectus abdominis muscles of female Wistar rats were explanted after euthanasia and cut into square pieces. The tissues were placed 3 mm apart, in an electrically insulated polydimethylsiloxane (PDMS) mold. GelMA-Bio-IL hydrogels as well as pure GelMA hydrogel (control) were photocrosslinked in situ between two pieces of tissue (FIG. 2E). Pulsed direct current test runs were conducted by applying 50 ms square pulses at increasing frequencies using short platinum wires that were positioned on one of the two pieces of muscle tissue. The induction of contraction was visually inspected in the sample on the opposite end of the hydrogel after applying electrical pulses at increasing voltages. Results demonstrated that muscle tissue samples joined together using GelMA-Bio-IL hydrogels exhibited a significantly lower excitation threshold when compared to pure GelMA hydrogel controls (FIG. 2F). These observations indicated that Bio-IL functionalized polymers could be used to restore functional integrity in tissues in which electrophysiological communication has been interrupted. Previous works have demonstrated the ability of ECHs to restore electrophysiological coupling of severed skeletal muscle tissue ex vivo, using PPy-chitosan (Mihic, A, et al., Circulation 2015, 132, 772) and GO/MeTro hydrogels (Annabi, N. et al., 2016, *Adv Mater,* 28, 40). However, the incorporation of the PPy polymer as well as GO nanoparticles into the hydrogel networks was associated with poorly tunable conductive properties. In contrast, Bio-IL functionalized hydrogels of the present disclosure exhibited a wide range of electroconductive properties (FIGS. 2C and 2D).

Example 4: Mechanical Characterization of Bio-Ionic Liquid Conjugated Hydrogels

Measurements showed that mechanical properties of the hybrid hydrogels were dependent on both the ratio of polymer to Bio-IL and the concentration of the conjugated polymer (GelMA-Bio-IL or PEGDA-Bio-IL) in the hydrogel. See FIGS. 3A-3D.

Figure 3A:
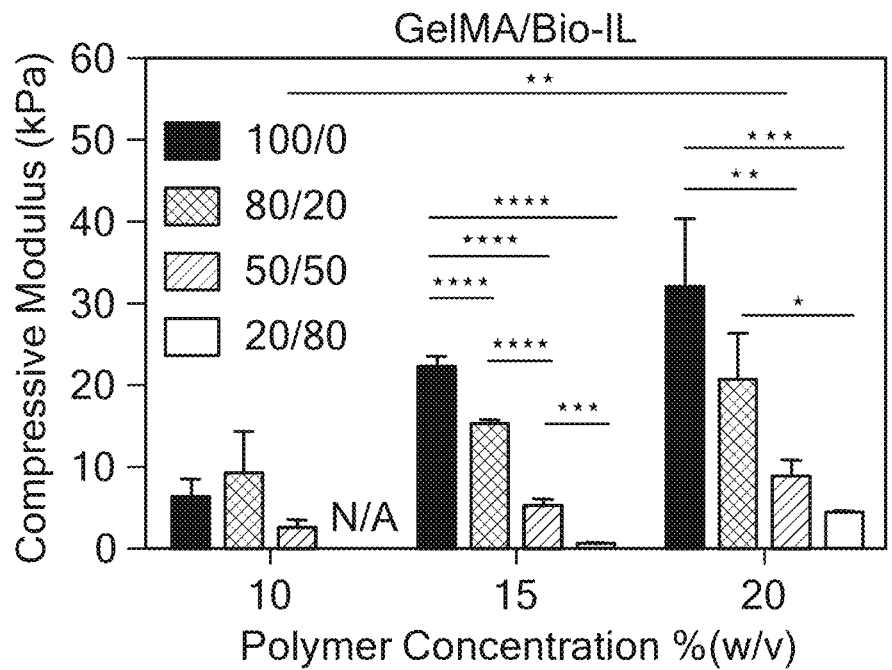
FIGS. 3A-3D are graphs showing measurements of mechanical properties of Bio-IL conjugated GelMA and PEGDA hydrogels crosslinked with visible light. Crosslinking was carried out by exposure to light for 120 seconds in the presence of 1% VC, 1.44% TEOA, and 0.1 mM Eosin Y.
Figure 3B:
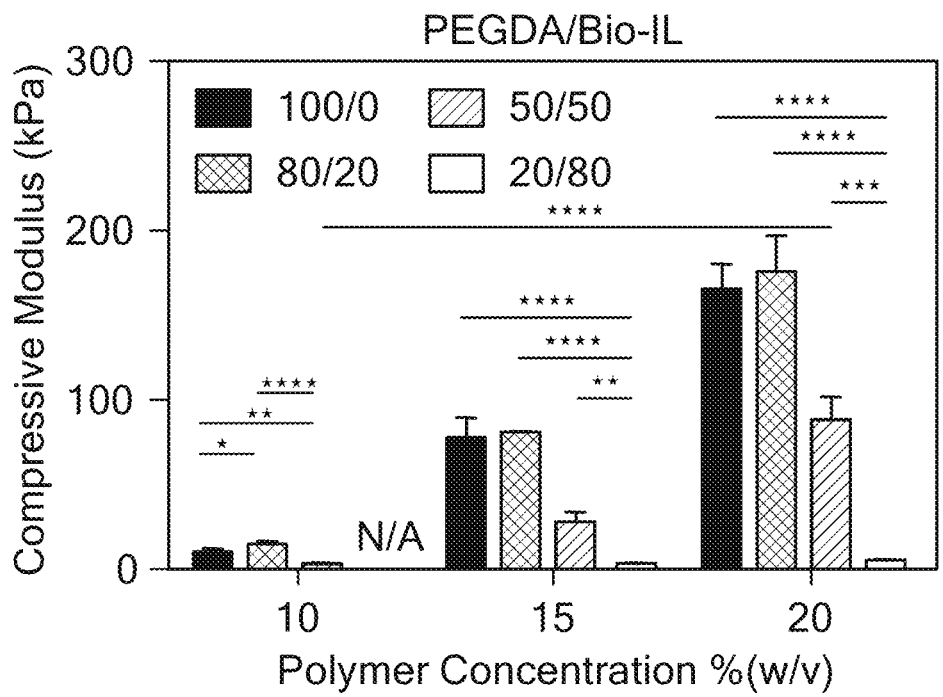

GelMA-Bio-IL hydrogels exhibited highly tunable compressive moduli in the range of 0.60 kPa to 32.07 kPa (see FIG. 3A). For GelMA-Bio-IL hydrogels corresponding to 10% polymer concentration, the compressive moduli were found to be 2.65±1.06 kPa, 9.2±5.27 kPa, and 6.50±2.38 kPa, at polymer to Bio-IL ratios of 1:1, 4:1, and 1:0, respectively. In particular, the condition corresponding to 10% polymer concentration and 1:4 polymer-Bio-IL ratio did not lead to structurally integral hydrogels, suggesting that 10% polymer concentration is below the threshold needed to allow for hydrogel formation. For GelMA-Bio-IL hydrogels corresponding to 15% polymer concentration, the compressive moduli were found to be 0.60±0.20 kPa, 5.53±0.76 kPa, 15.43±0.40 kPa, and 22.10±1.55 kPa, at polymer to Bio-IL ratios of 1:4, 1:1, 4:1, and 1:0, respectively. Lastly, GelMA-Bio-IL hydrogels at 20% polymer concentration yielded compressive moduli of 4.47±0.25 kPa, 8.87±1.83 kPa, 20.57±5.60 kPa, and 32.07±8.61 kPa, at polymer to Bio-IL ratios of 1:4, 1:1, 4:1, and 1:0, respectively. PEGDA-based hydrogels exhibited similar trends in their compressive behaviors when compared to GelMA-based hydrogels. However, compressive moduli recorded for PEGDA-Bio-IL hydrogels was larger than those recorded for their GelMA counterparts, and ranged from 1.27 kPa to 178.13 kPa. See FIG. 3B. For PEGDA-Bio-IL hydrogels corresponding to 10% polymer concentration, the compressive moduli were found to be 2.17±0.10 kPa, 14.57±1.73 kPa, and 9.90±0.70 kPa at polymer to Bio-IL ratios of 1:1, 4:1, and 1:0, respectively. Similar to that observed for GelMA-based hydrogels, the condition corresponding to 10% polymer concentration and 1:4 PEGDA to Bio-IL ratio did not yield viable hydrogels. For PEGDA-Bio-IL hydrogels corresponding to 15% polymer concentration, the compressive moduli were found to be 1.27±0.30 kPa, 28.73±0.55 kPa, 82.00±0.80 kPa, and 78.17±4.87 kPa at polymer to Bio-IL ratios of 1:4, 1:1, 4:1, and 1:0, respectively. Lastly, PEGDA-Bio-IL hydrogels at 20% polymer concentration yielded compressive moduli of 4.40±0.77 kPa, 89.83±4.16 kPa, 178.13±3.48 kPa, and 166.40±3.25 kPa at polymer to Bio-IL ratios of 1:4, 1:1, 4:1, and 1:0, respectively.

Figure 3C:
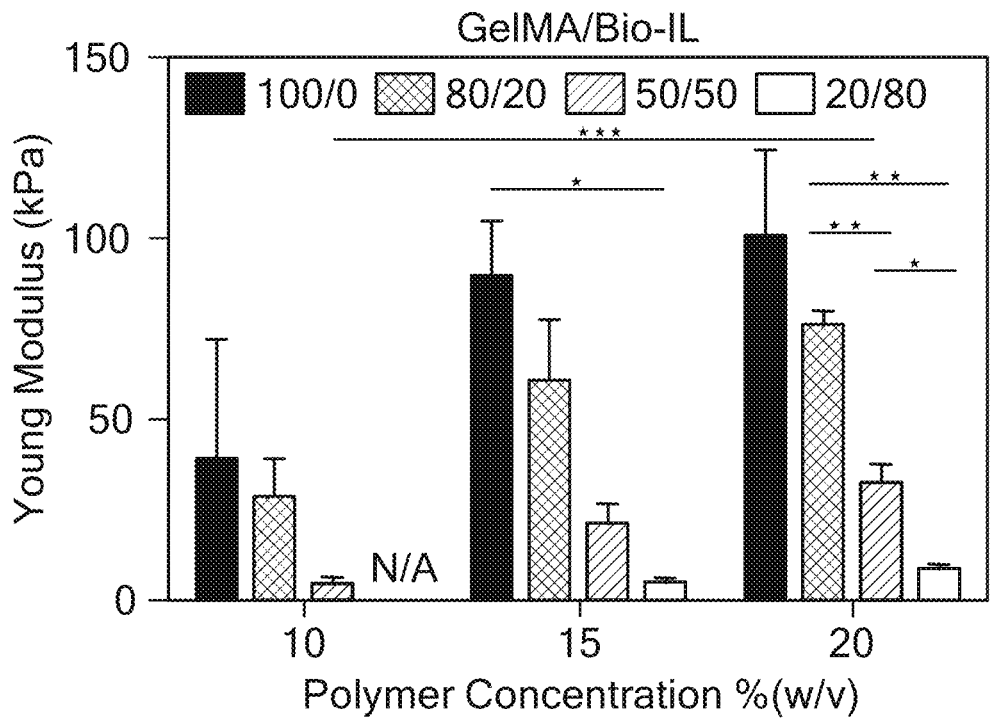
Figure 3D:
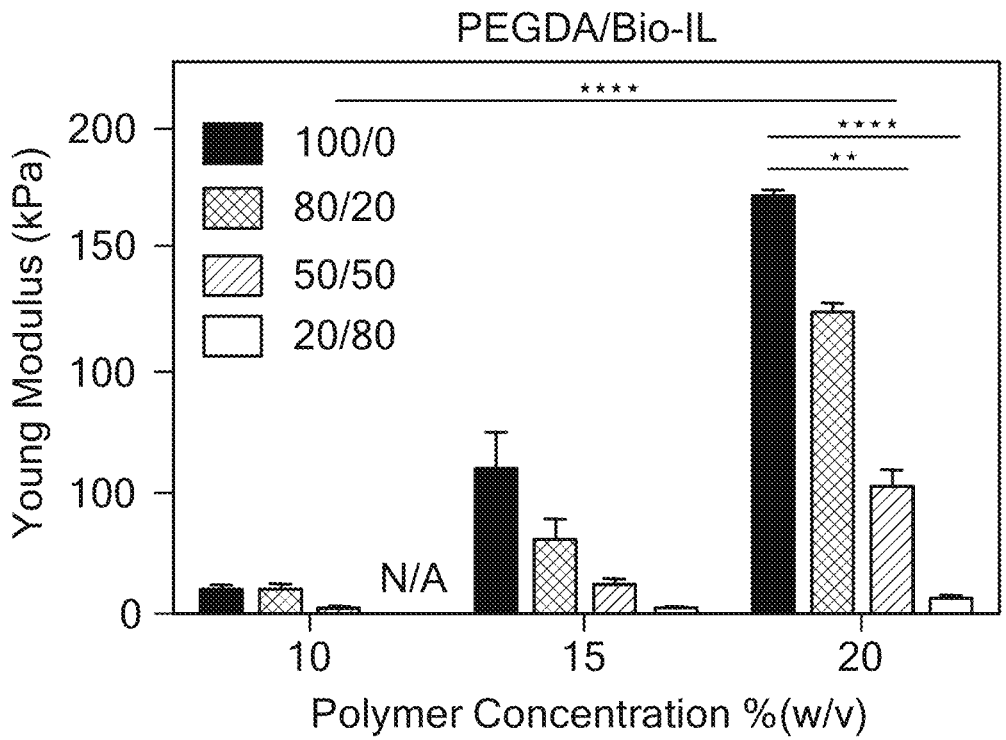

GelMA-Bio-IL also exhibited highly tunable Young's moduli in the range of 5.40 kPa to 100.77 kPa, (FIG. 3C). Similar to compressive modulus, the values for Young's modulus also increased at higher polymer concentration values. For GelMA-Bio-IL hydrogels corresponding to 10% polymer concentration, the Young's moduli were found to be 5.20±1.15 kPa, 29.33±9.65 kPa, and 38.90±33.18 kPa at polymer to Bio-IL ratios of 1:1, 4:1 and 1:0, respectively. See FIG. 3C. For GelMA-Bio-IL hydrogels at 15% polymer concentration, Young's moduli were observed to be 5.40±0.86 kPa, 21.30±5.75 kPa, 60.73±17.50 kPa, and 89.30±15.65 kPa at polymer to Bio-IL ratios of 1:4, 1:1, 4:1, and 1:0, respectively. Lastly, GelMA-Bio-IL hydrogels at 20% CPC exhibited Young's modulus of 9.43±1.20 kPa, 33.13±4.77 kPa, 77.23±3.68 kPa, and 100.77±23.95 kPa at polymer to Bio-IL ratios of 1:4, 1:1, 4:1, and 1:0, respectively. Similar to the compressive modulus values, the values of Young's modulus recorded for PEGDA-Bio-IL hydrogels were larger than those of GelMA-based hydrogels, and ranged from 2.60 kPa to 172.70 kPa (see FIG. 3D). For PEGDA-Bio-IL hydrogels corresponding to 10% polymer concentration, the values recorded for Young's modulus were 2.60±0.45 kPa, 10.57±2.05 kPa, and 10.60±0.56 kPa at polymer to Bio-IL ratios of 1:1, 4:1, and 1:0, respectively. When polymer concentration was increased to 15%, the Young's moduli increased to 2.73±0.45 kPa, 13.43±3.19 kPa, 31.60±8.74 kPa, and 60.00±15.85 kPa at polymer to Bio-IL ratios of 1:4, 1:1, 4:1, and 1:0 respectively. Lastly, PEGDA-Bio-IL hydrogels at 20% CPC yielded Young's moduli of 7.70±1.58 kPa, 54.37±6.34 kPa, 125.33±3.56 kPa, and 172.70±2.86 kPa at polymer to Bio-IL ratios of 1:4, 1:1, 4:1, and 1:0, respectively.

Example 5: Mechanical Characterization of Bio-IL Conjugated Hydrogels

Figure 4A:
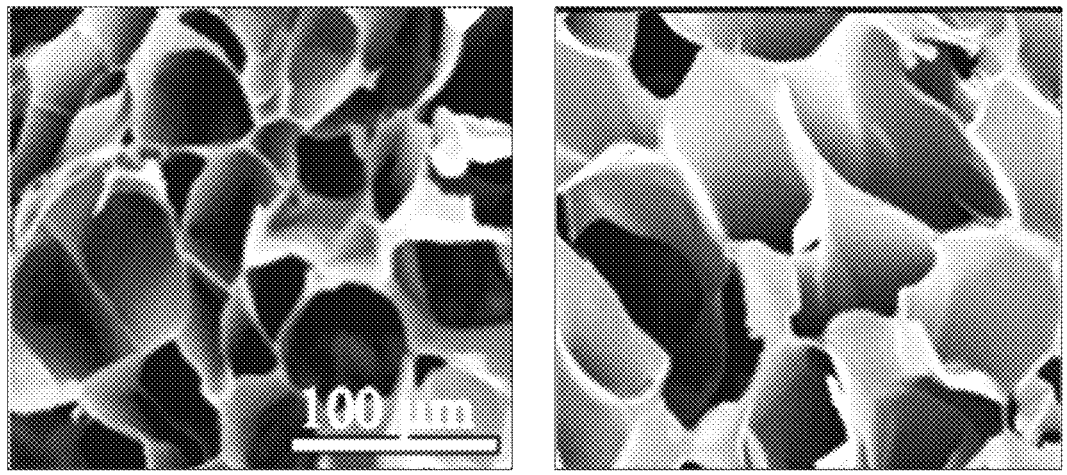
FIGS. 4A-4H are images and graphs showing in vitro degradation, swelling, and pore characteristics of polymer-Bio-IL hydrogels.
Figure 4B:
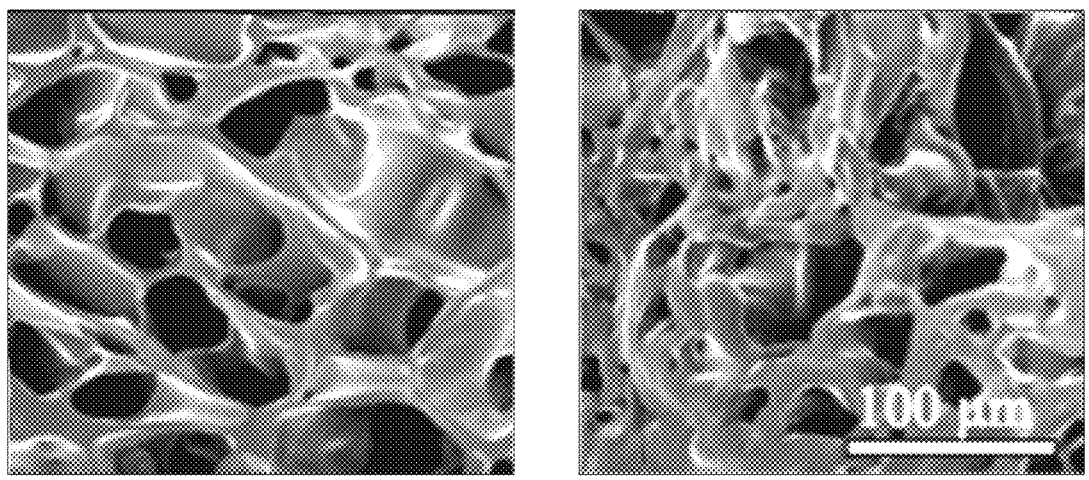
Figure 4C:
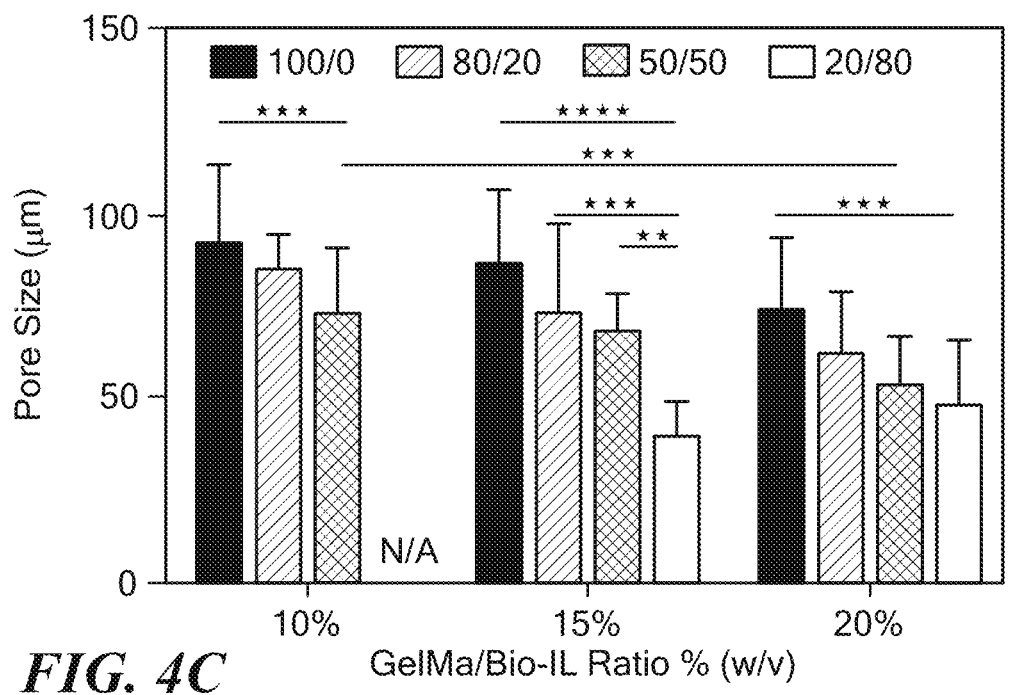
Figure 4D:
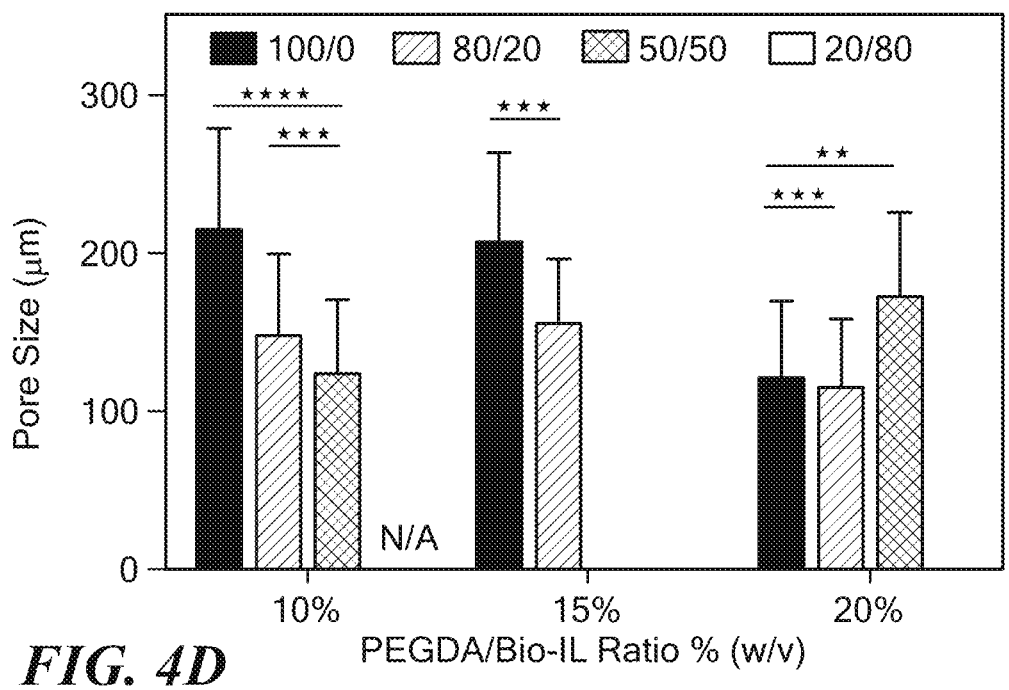

Porosity of the engineered GelMA-Bio-IL and PEGDA-Bio-IL hydrogels was investigated using scanning electron microscopy (SEM). See FIGS. 4A and 4B. Similar to that observed with mechanical characterization, SEM image analysis suggested that the size of pores in the GelMA-Bio-IL and PEGDA-Bio-IL hydrogels was dependent mainly on the concentration of the polymer in the hydrogel and the proportion of Bio-IL in the conjugated polymer. See FIGS. 4C and 4D. For example, the overall pore sizes of GelMA-Bio-IL hydrogels decreased upon increasing the polymer concentration from 10% to 20%. Similarly, the values of the pore size decreased as the concentration of the Bio-IL increased from 0% to 80%. These results show that the porosity of the hydrogels is tunable.

Figure 4E:
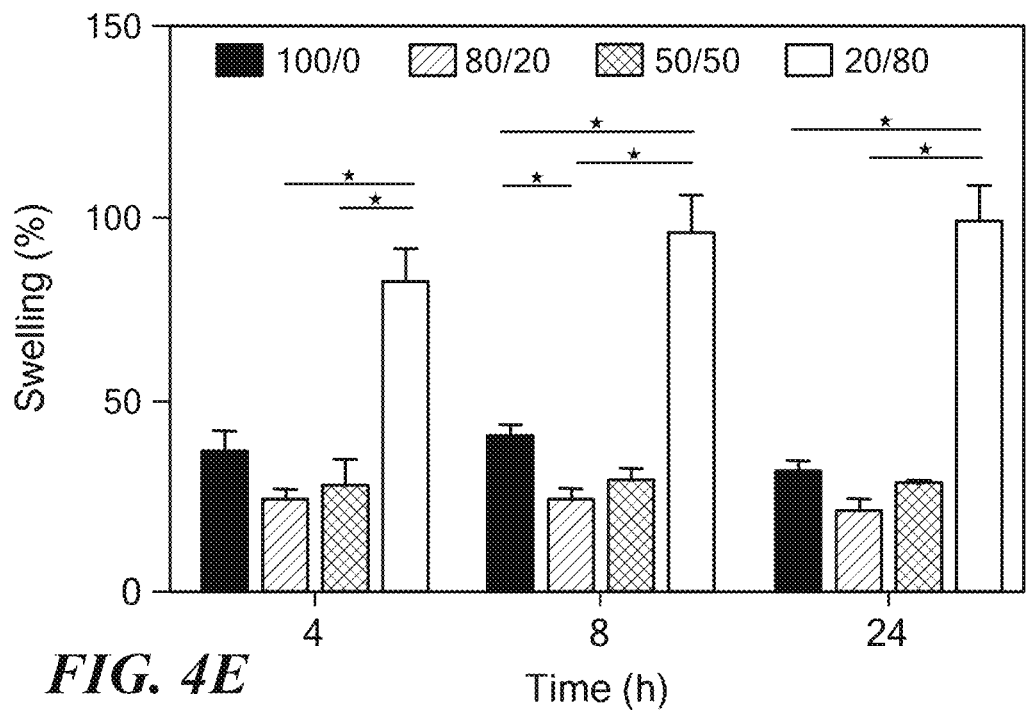
Figure 4F:
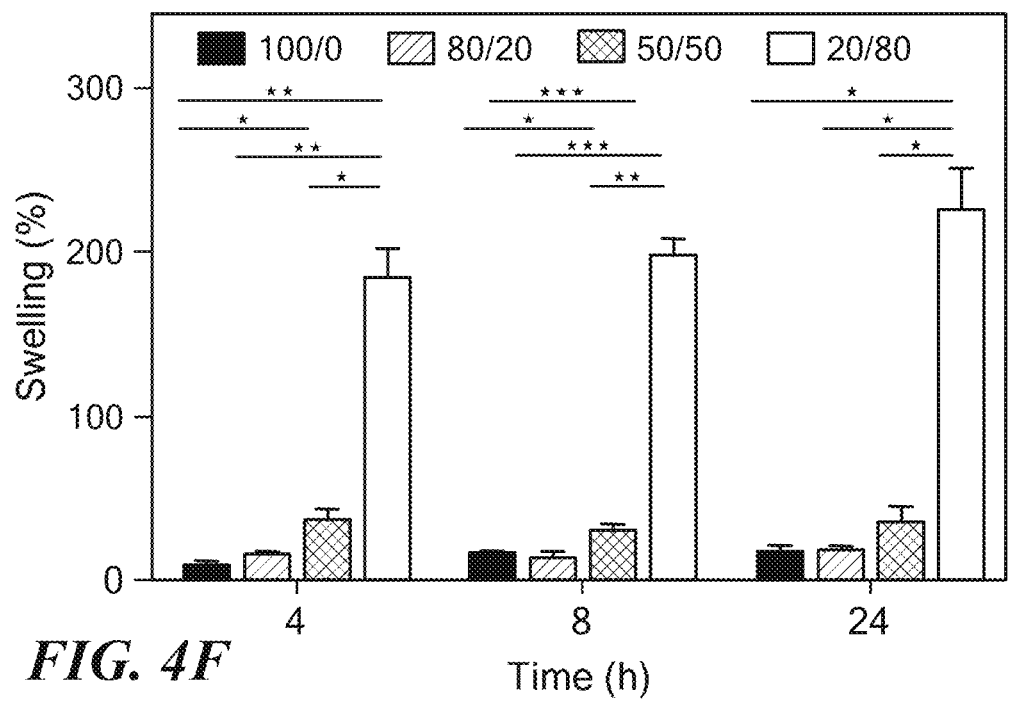

Water uptake ability and in vitro degradation of the hydrogels were analyzed next. Results showed that the highest swelling for both GelMA-Bio-IL (FIG. 4E) and PEGDA-Bio-IL (FIG. 4F) hydrogels was observed at the highest concentration of Bio-IL (80%) in the conjugated polymer. This behavior is explained in part due to the presence of hydroxyl (—OH) and amine (—$NH_2$) hydrophilic residues in the choline acrylate structure (Ganji, F. et al., 2010, *Iran Polym J*, 19, 375). Scaffolds with greater number of hydrophilic groups would therefore take up larger amounts of water making them more swellable.

Figure 4G:
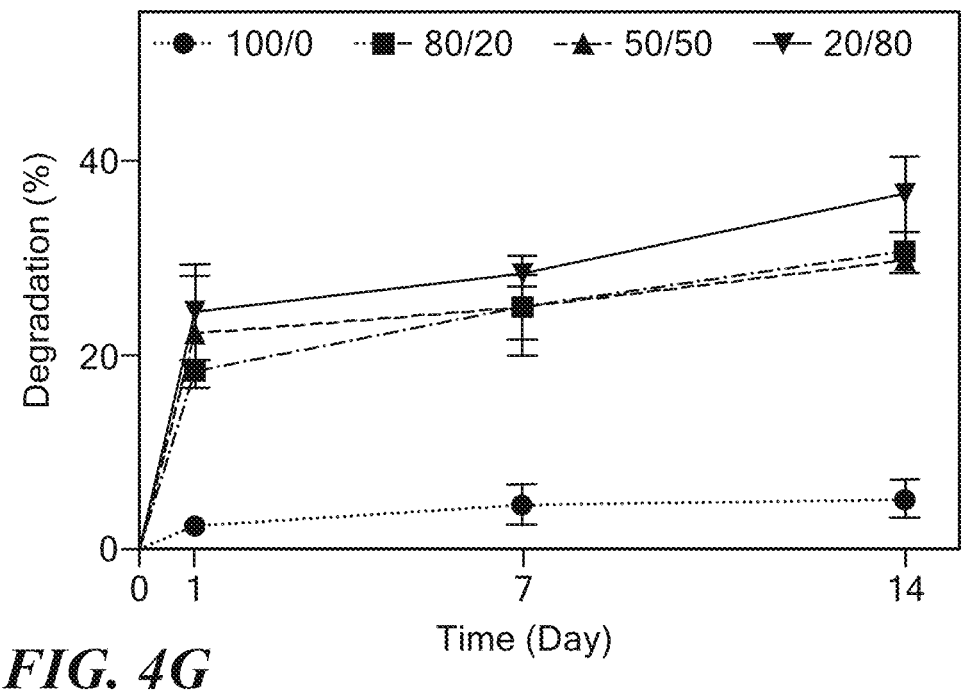
Figure 4H:
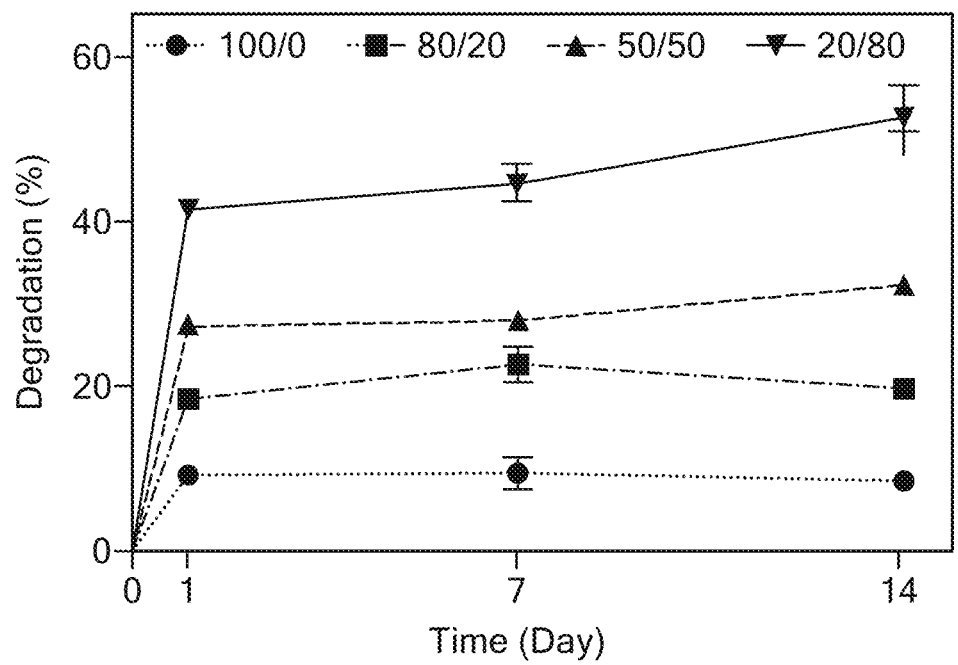

In vitro degradation of the engineered hybrid hydrogels were evaluated by incubating GelMA-Bio-IL and PEGDA-Bio-IL hydrogels in DPBS and DPBS with FBS at 37° C. for 14 days. Results demonstrated that in vitro degradation of each of GelMA-Bio-IL (FIG. 4G) and PEGDA-Bio-IL (FIG. 4H) occurred mainly by day 1 of incubation. Importantly, the degree of degradation of both GelMA-Bio-IL and PEGDA-Bio-IL hydrogels was observed to be greater at higher Bio-IL concentrations.

Taken together, these results demonstrated that the mechanical properties of swellability, degradation, and porosity of the GelMA-Bio-IL and PEGDA-Bio-IL hydrogels can be modulated by varying the polymer concentration as well as the polymer-Bio-IL ratio. This remarkable tunability of the physical characteristics of the engineered hydrogels suggests that they would be useful in different biomedical applications, each requiring a hydrogel having a particular set of mechanical properties.

Example 6: In Vitro Biocompatibility of the Engineered GelMA-Bio-IL Hydrogel

Figure 5A:
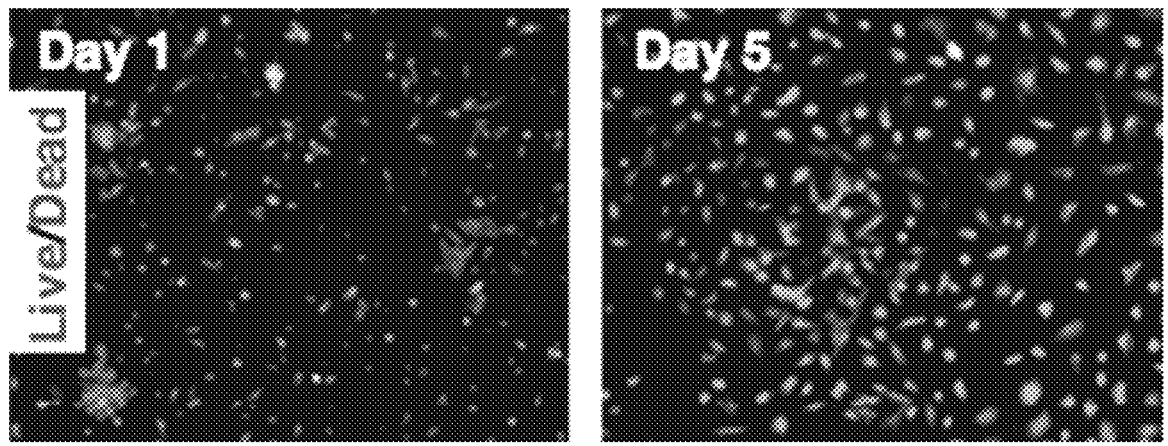
FIGS. 5A-5I are immunofluorescent images and graphs showing results of in vitro 2D culture of cardiomyocytes seeded on the surface of GelMA-Bio-IL hydrogels.
Figure 5B:
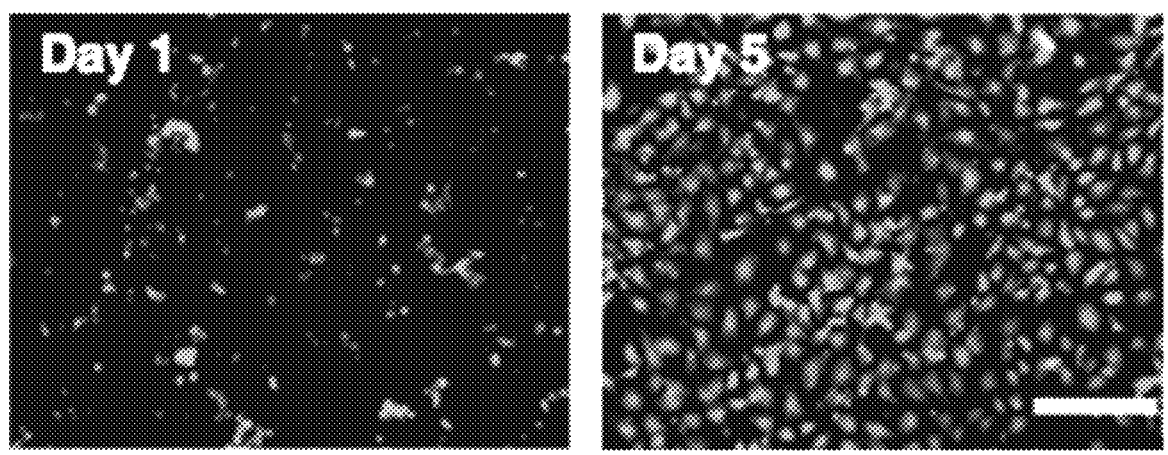
Figure 5C:
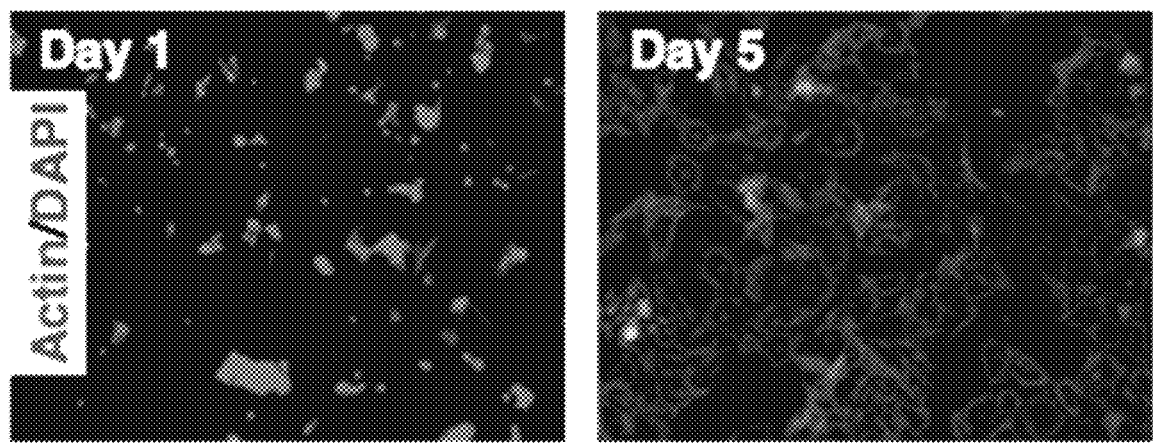
Figure 5D:
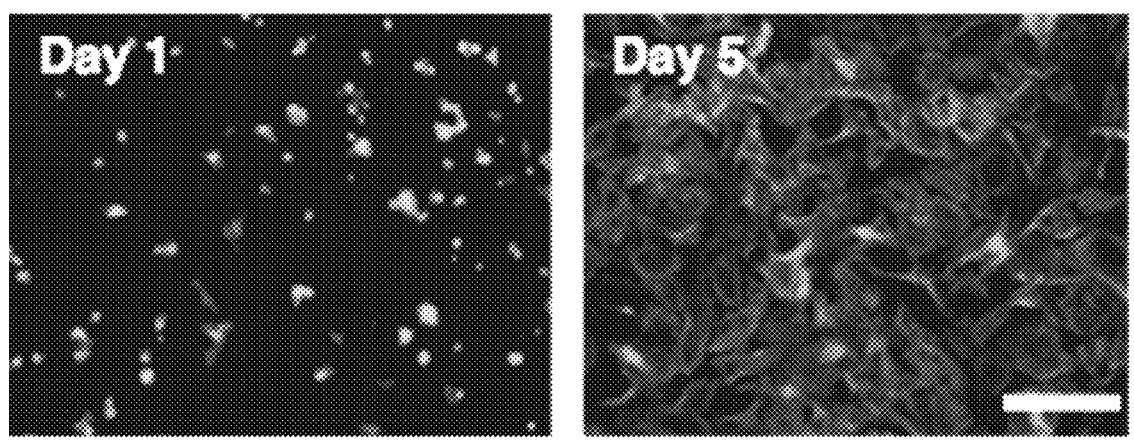
Figure 5E:
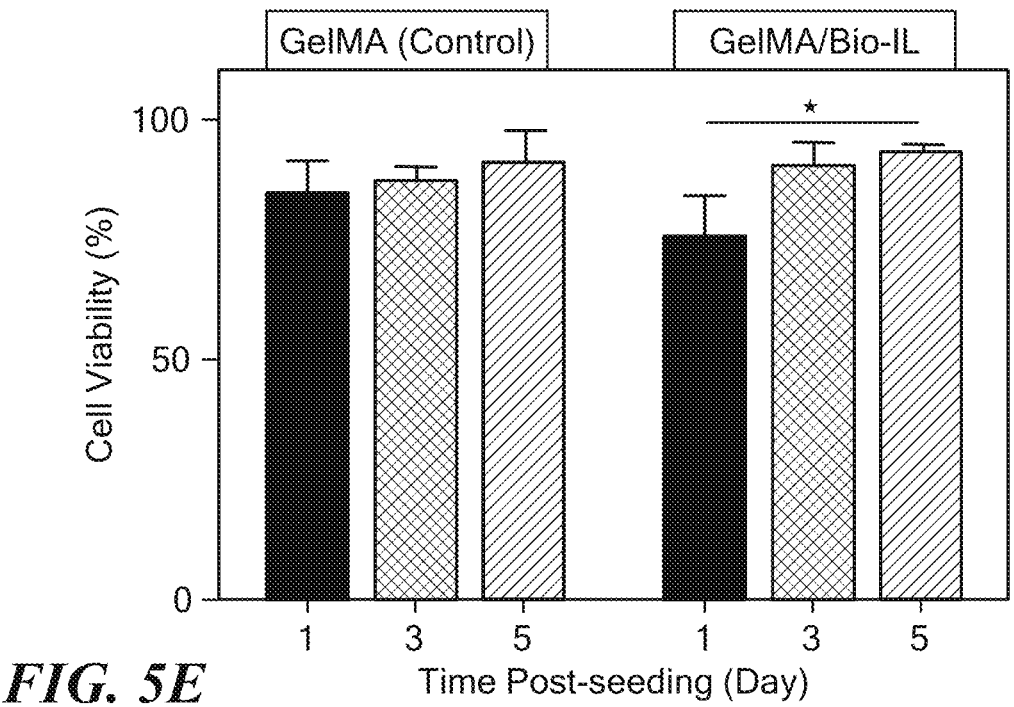
Figure 5F:
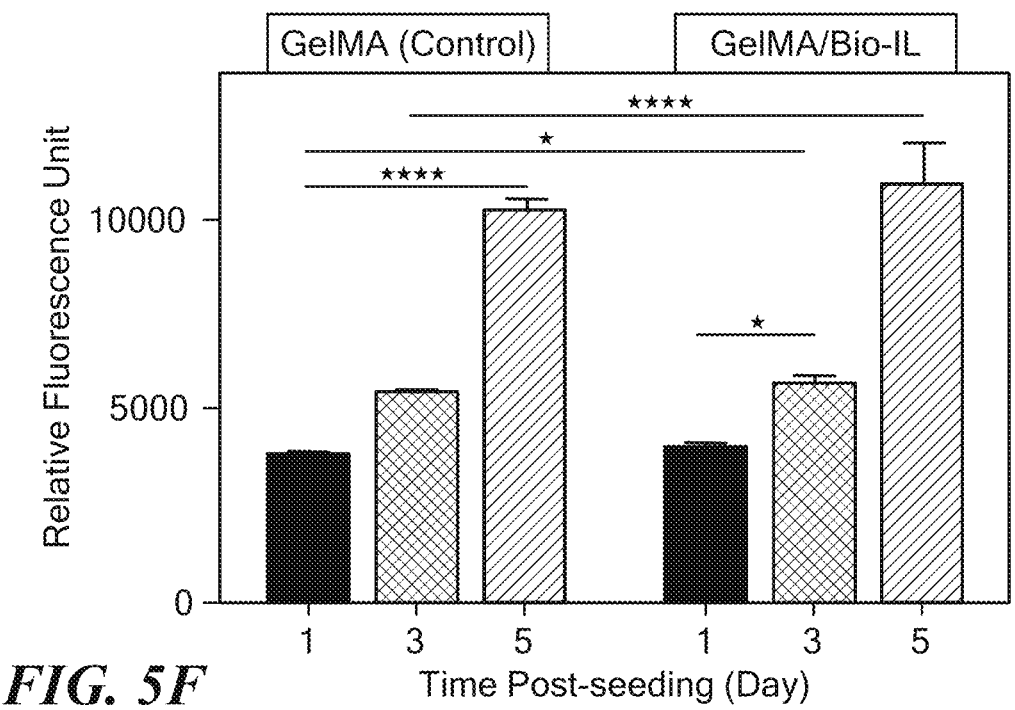
Figures 5G, 5H:
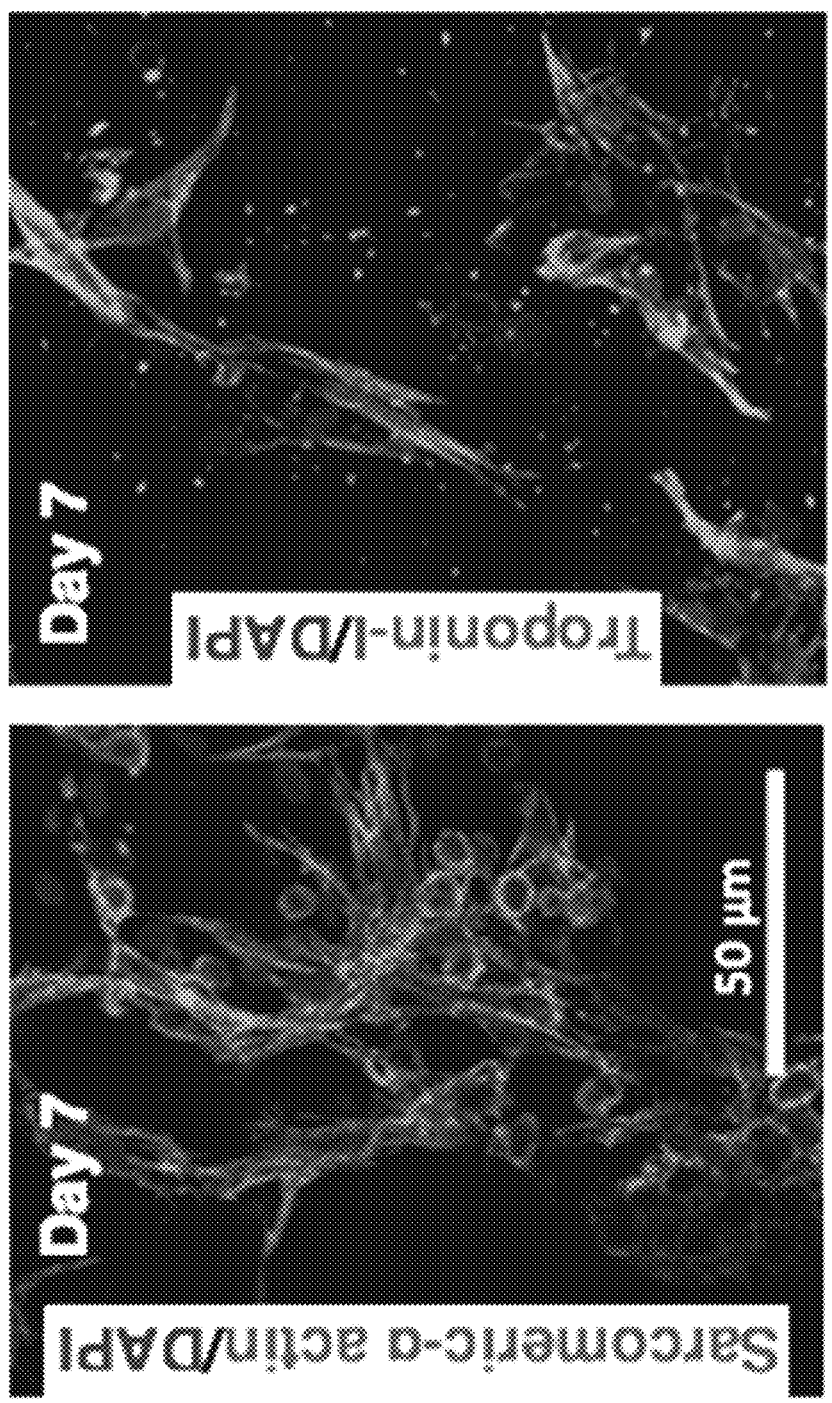
Figure 5I:
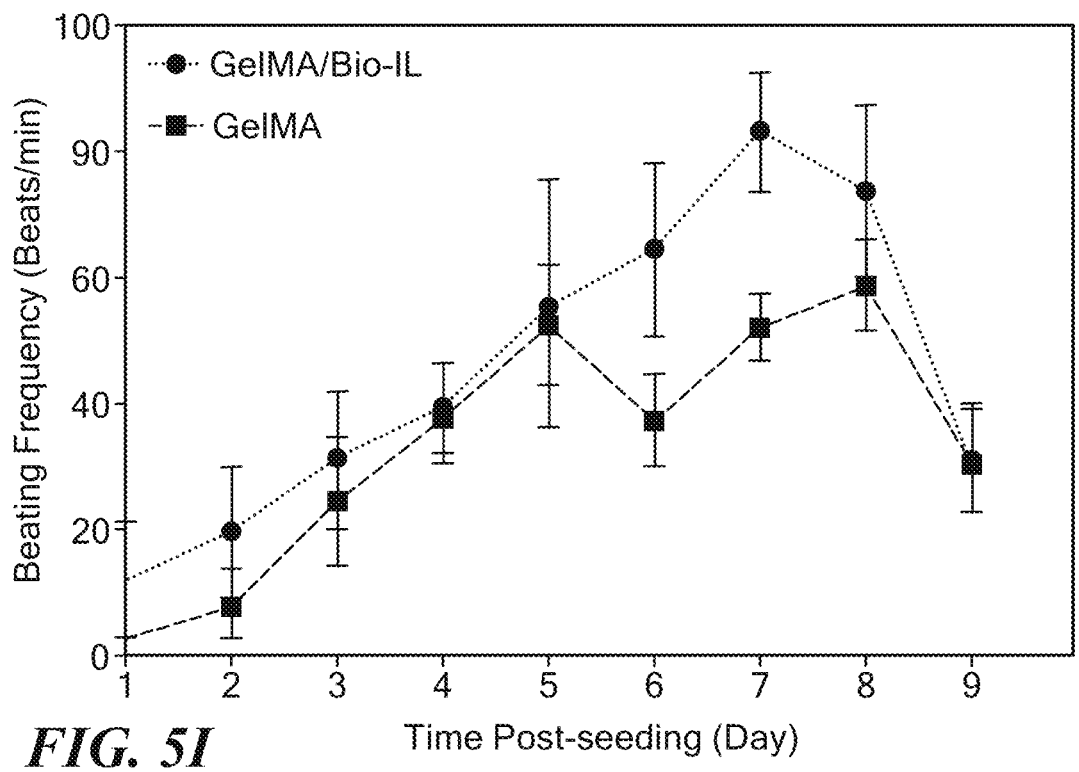

GelMA-Bio-IL hydrogel was tested for its ability to support cell proliferation, organization, and function in vitro. Primary rat cardiomyocytes were used as exemplary excitable cells for these tests. Commercially available assays were used with cardiomyocytes growing on the surface of GelMA or GelMA-Bio-IL over a period of 5 days to quantify live versus dead cardiomyocytes and to assess their metabolic activity to determine cell viability. See FIGS. 5A to 5D. Similarly, cell attachment and spreading on the surface of GelMA and GelMA-Bio-IL scaffolds were evaluated through F-actin-DAPI immunofluorescence staining. See FIGS. 5E to 5H. Lastly, the ability of the electroconductive GelMA-Bio-IL scaffolds to maintain the native phenotype and function of primary cardiomyocytes in vitro was also tested. Native phenotype was assessed by checking the expression of the cardiac differentiation marker sarcomeric α-actinin and troponin I (FIGS. 5I and 5J).

On the other hand, function was assessed by evaluating the contractile behavior of primary cardiomyocytes in 2D cultures (FIG. 5K). Results demonstrated that the viability of cardiomyocytes grown on the surface of hydrogels was not affected due to their interaction with the engineered hybrid scaffolds (FIG. 5, (l)). Although cells seeded on the surface of GelMA-Bio-IL hydrogel appeared to exhibit lower viability at day one post-seeding when compared to those seeded on the surface of control GelMA hydrogel, there was no statistically significant difference between the two cell populations at days three and five post-seeding. Furthermore, the metabolic activity of the primary cultures increased consistently throughout the duration of the experiment (see FIG. 5 (m)). This is probably a result of adaptation of the cells to the in vitro culture conditions as well as proliferation of cardiac fibroblasts present among the cardiomyocytes, which could not be removed during cardiomyocyte isolation. Lastly, immunofluorescence staining of F-actin filaments revealed that primary cultures attached and spread efficiently across the surface of the engineered hydrogels (see FIG. 5, (i) and (j)). Collectively, the results show that the biocompatibility profile of GelMA-Bio-IL hydrogels is similar to that of the GelMA controls and that they can facilitate the growth of primary cardiomyocytes on 2D cultures in vitro.

Cardiomyocytes maintained in 2D environments tend to revert to a less mature phenotype and lose the ability to respond to physiologic stimuli. Hence, in addition to maintaining a metabolically active state, preservation of native phenotype is critical to promote spatial and functional organization of cardiomyocytes. Immunofluorescence staining of the cardiac differentiation marker sarcomeric α-actinin revealed that cardiomyocytes in the GelMA-Bio-IL hydrogels were distributed in spatially-relevant multi-cellular organization (FIG. 5, (i) and (j)). These images also show that cardiomyocytes seeded on the surface of the engineered hydrogels exhibit cross-striations, which are indicative of the sarcomeric structures present in the native ventricular myocardium. Lastly, cardiomyocytes growing in the GelMA-Bio-IL hydrogels showed a more robust and stable spontaneous contraction profile, when compared to the GelMA controls (see FIG. 5, (k)). These observations suggest that the electroconductive hydrogel promotes the formation of interconnected cellular networks on the surface of the hydrogel, which in turn promotes tissue-level function of primary cardiomyocytes in vitro.

Apart from material biocompatibility, the integration of physiological stimuli is critical to promote growth and survival as well as spatial and functional organization of excitable cells. After myocardial infarction, the nonconductive nature of the resulting scar tissue leads to ventricular dysfunction as well as electrical uncoupling of viable cardiomyocytes in the infarcted region. Due to the limited regenerative potential of adult cardiomyocytes, several regenerative cardiac tissue engineering approaches have been developed using either cell-based or material-based scaffolds. However, one of the major limitations of conventional biomaterial approaches is that the insulating polymeric scaffolds diminish the transfer of electrical signals between cardiomyocytes, which could result in arrhythmias after implantation.

Scaffolds made of electroconductive materials and having the ability to promote impulse propagation and synchronize contraction could help restore ventricular function by electrically coupling isolated cardiomyocytes to the native tissue. In vitro assessment of GelMA-Bio-IL hydrogels demonstrated that they are cytocompatible and promote cell adhesion and spread. Moreover, the proliferative spread of cardiomyocytes across the electroconductive GelMA-Bio-IL hydrogels was significantly larger when compared to pure GelMA (FIG. 5D), which makes them remarkably suitable for cardiac tissue engineering applications. Enhanced proliferation of cardiomyocytes on GelMA-Bio-IL scaffolds would be greatly beneficial in restoration of impaired electrical conductivity and tissue function in scarred peri-infarct regions.

Figure 6A:
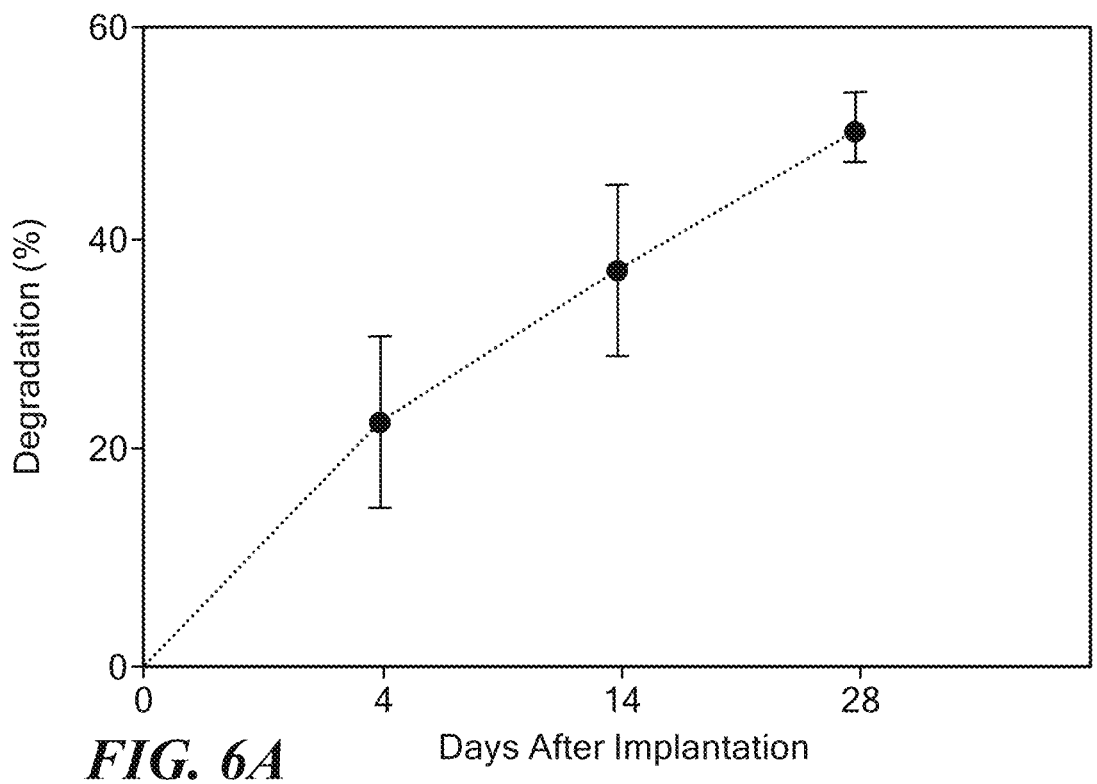
Figure 7A:
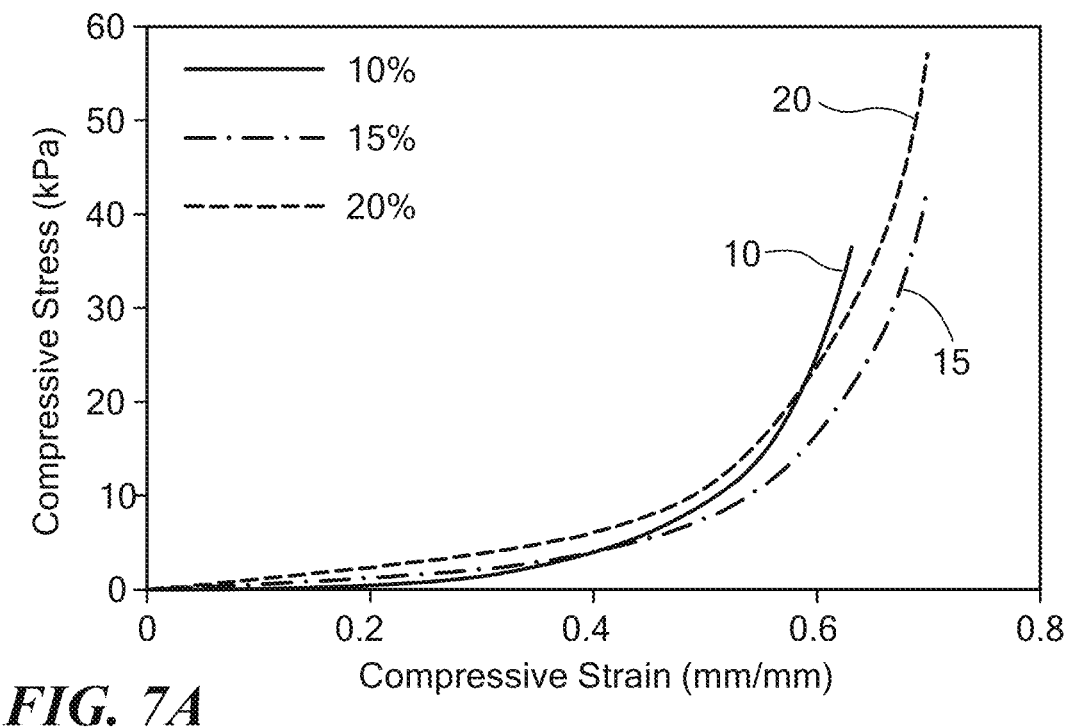
FIGS. 7A-7D are a set of representative graphs showing evaluation of mechanical properties of Bio-IL functionalized GelMA and PEGDA hydrogels crosslinked with visible light.
Figure 7B:
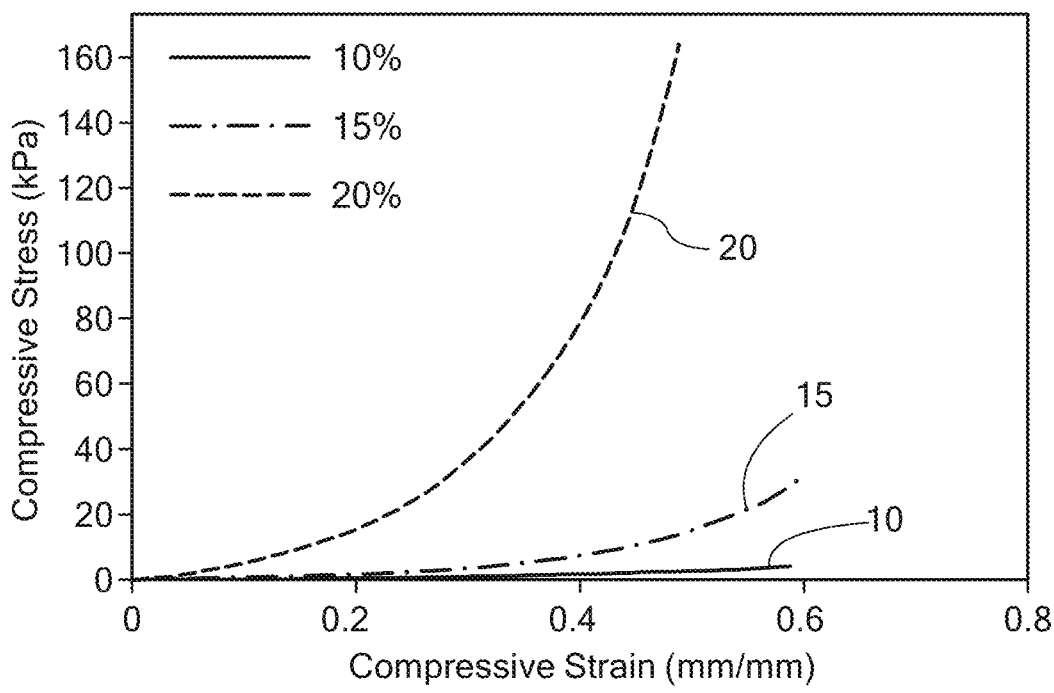
Figure 7C:
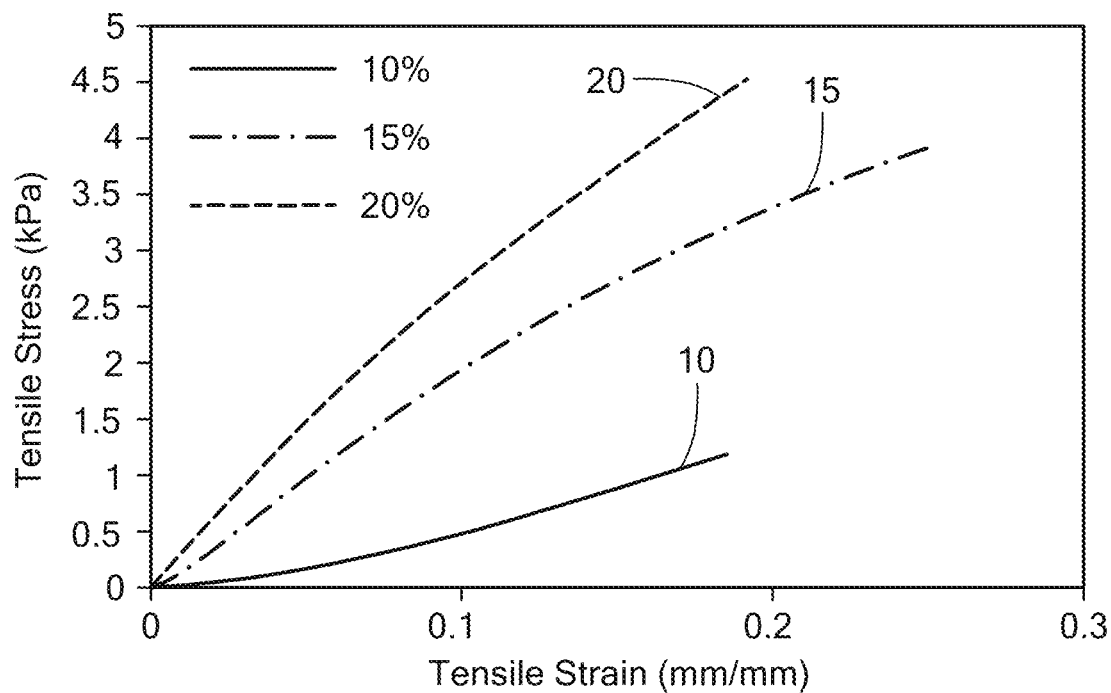
Figure 7D:
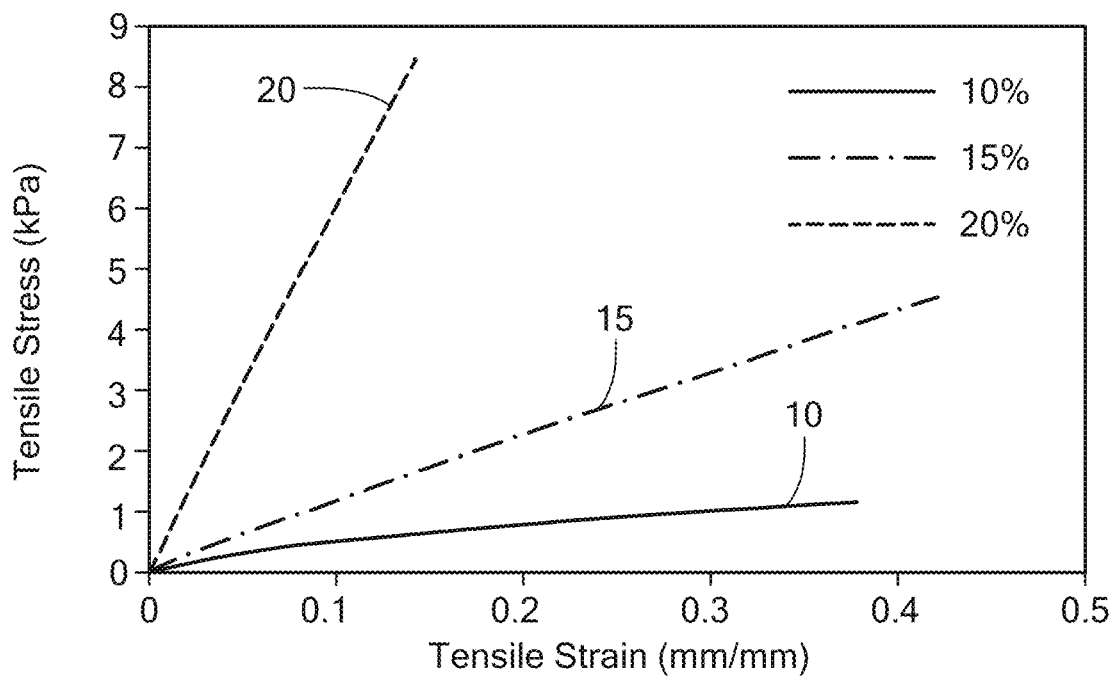
Figure 8A:
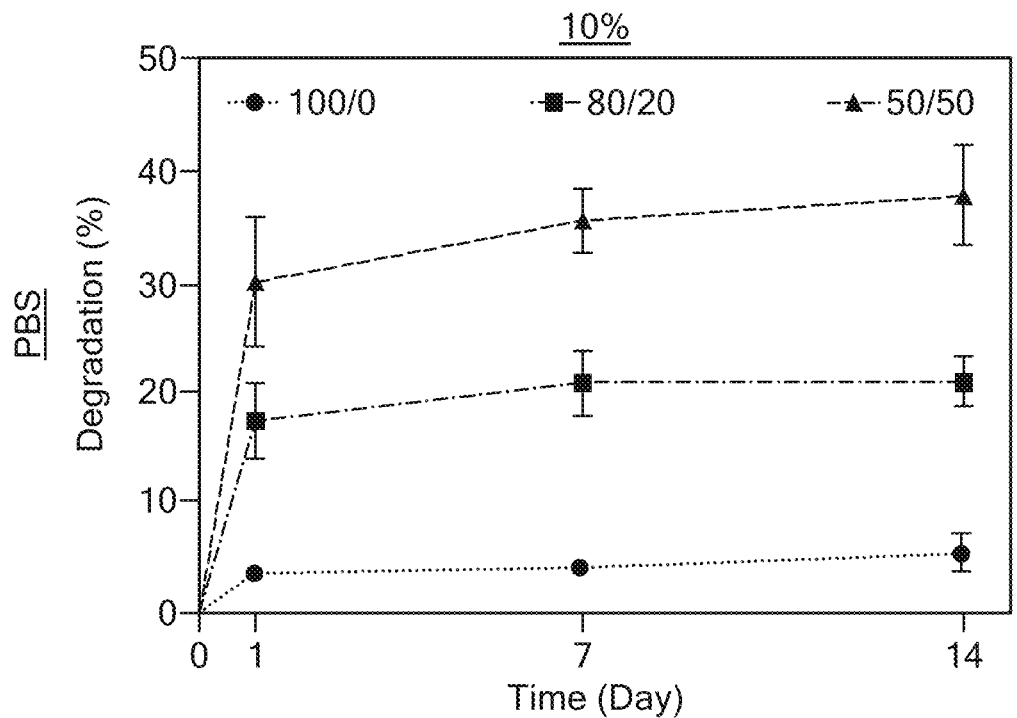
FIGS. 8A-8F are a set of graphs showing the evaluation of in vitro degradation of Bio-IL functionalized GelMA hydrogels.
Figure 8B:
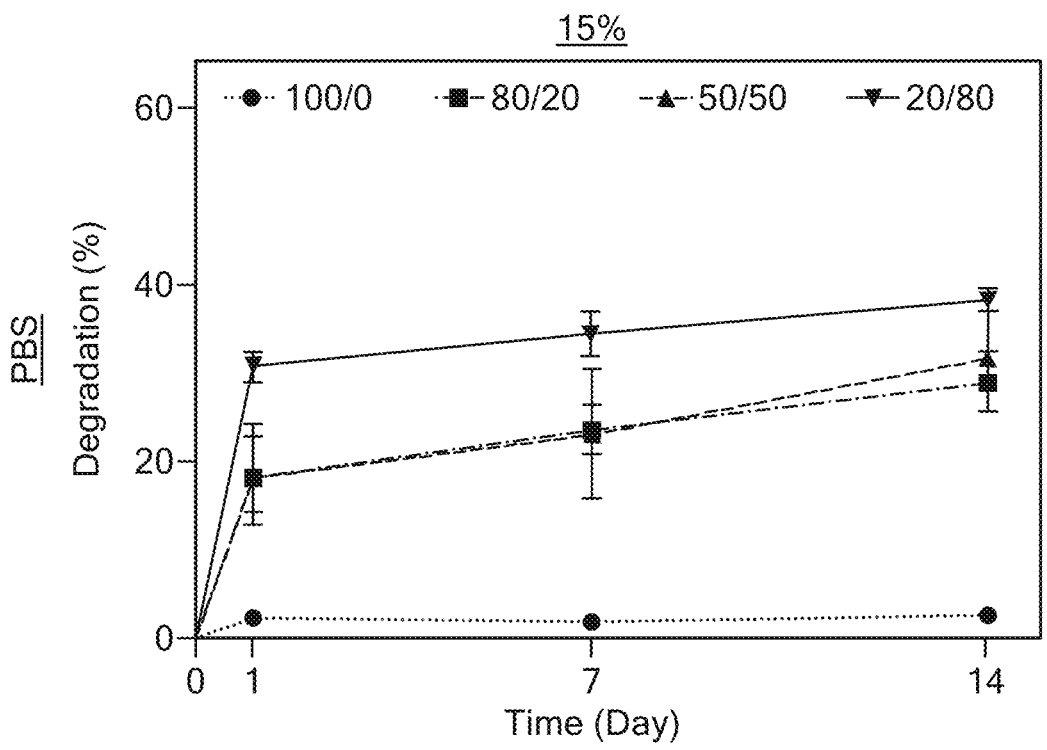
Figure 8C:
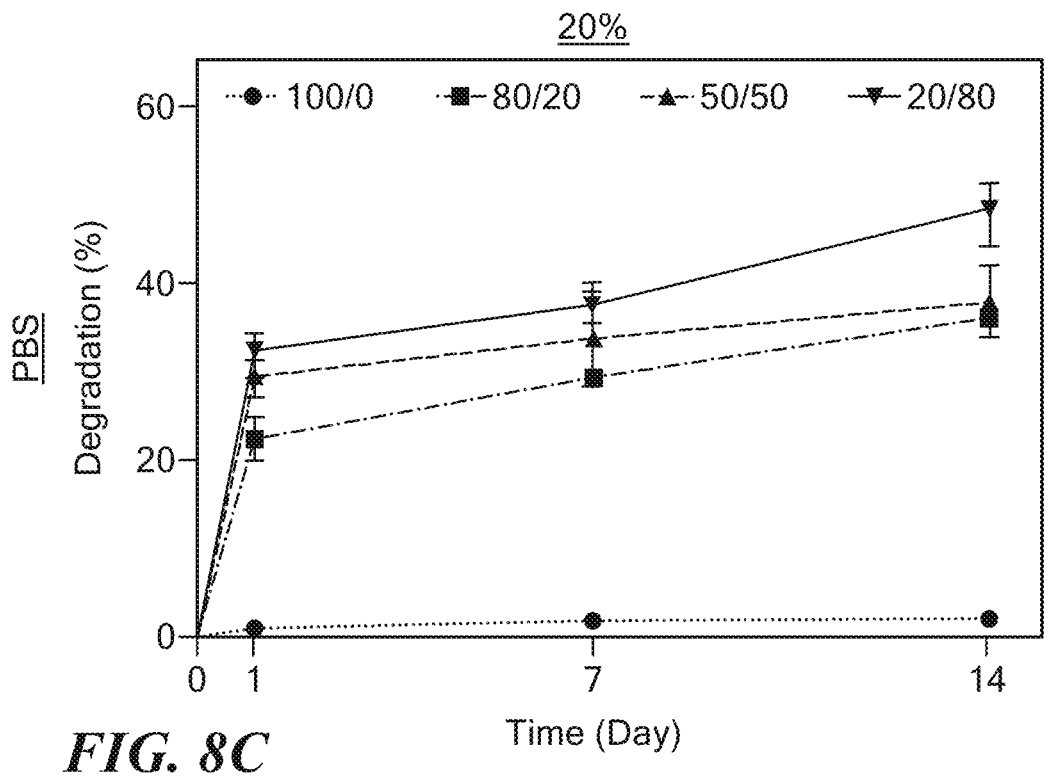
Figure 8D:
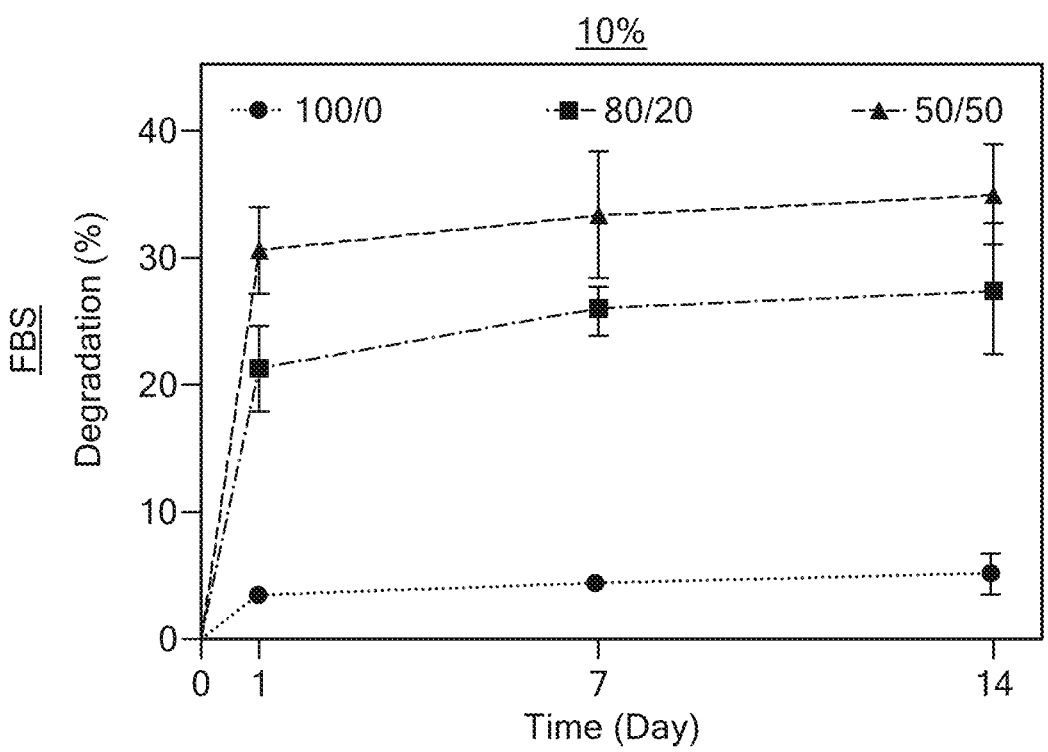
Figure 8E:
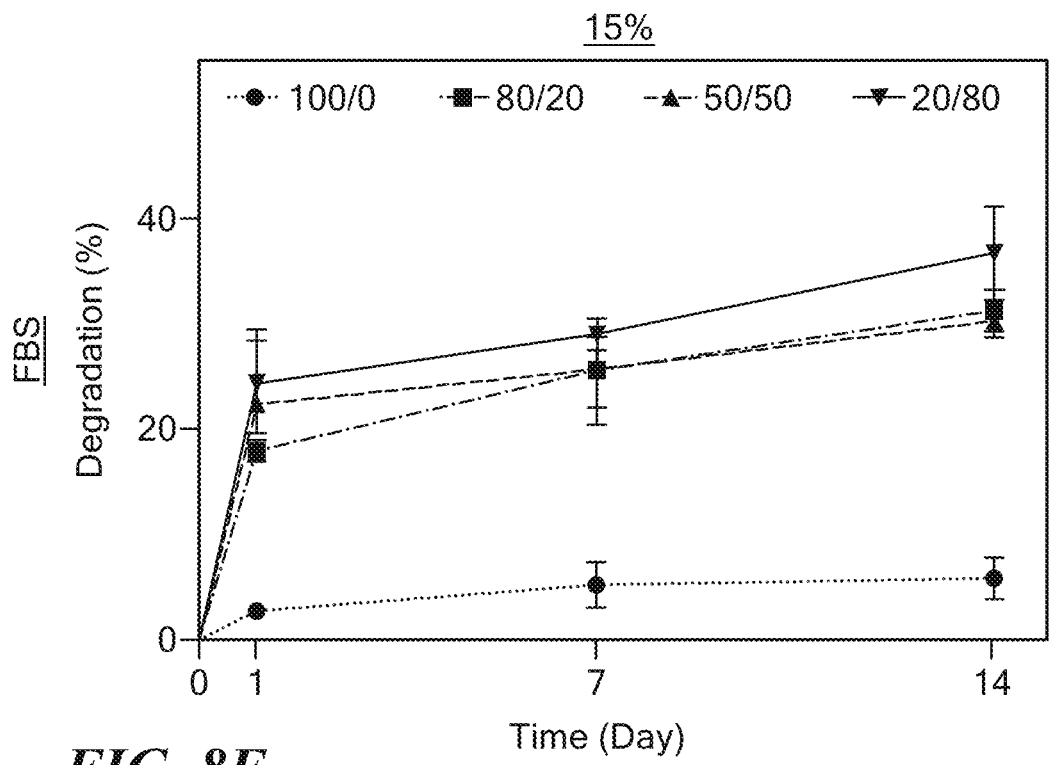
Figure 8F:
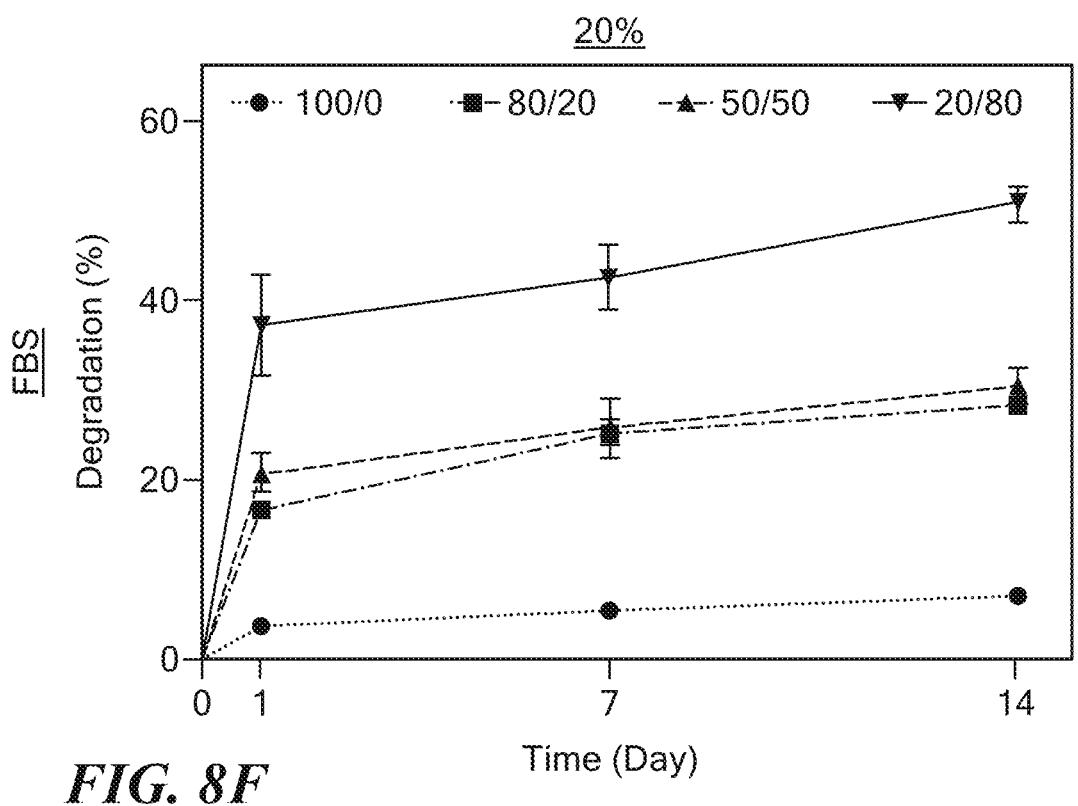
Figure 9A:
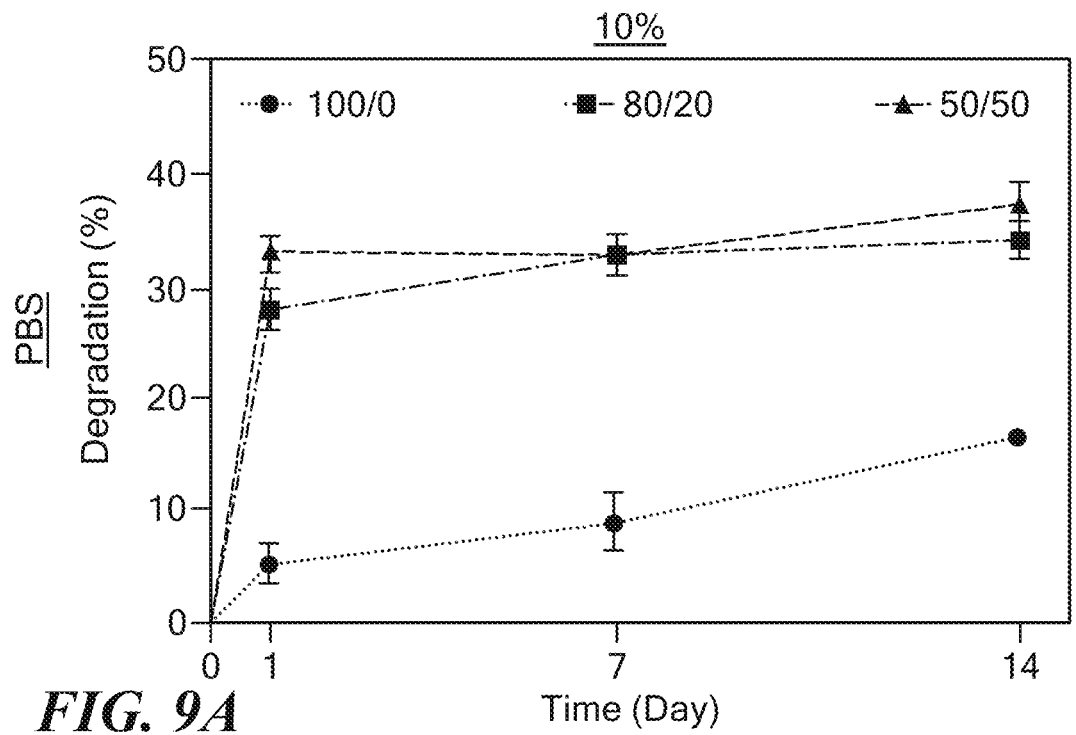
FIGS. 9A-9F are a set of graphs showing the evaluation of in vitro degradation of PEGDA-Bio-IL hydrogels.
Figure 9B:
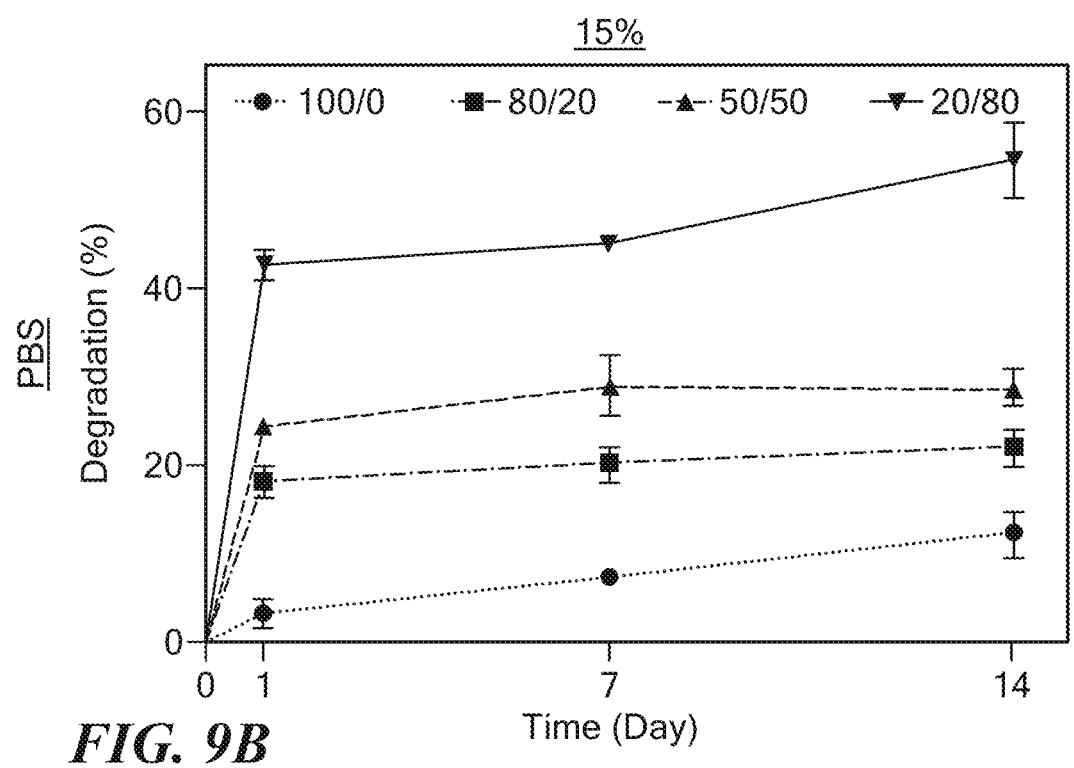
Figure 9C:
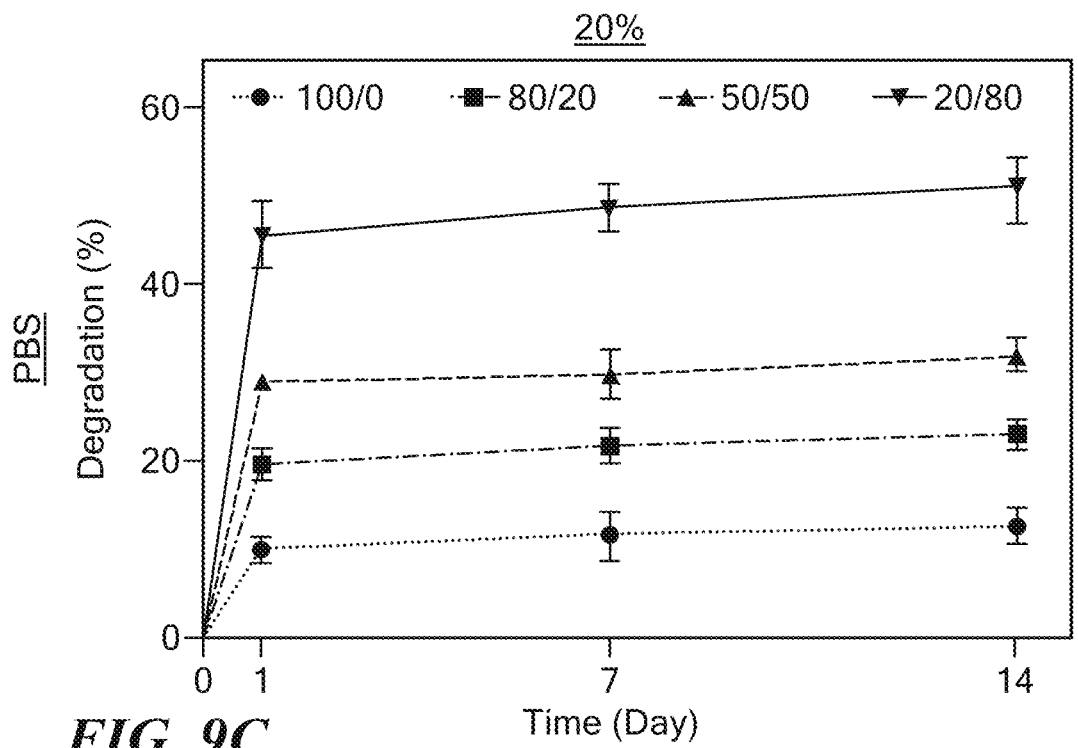
Figure 9D:
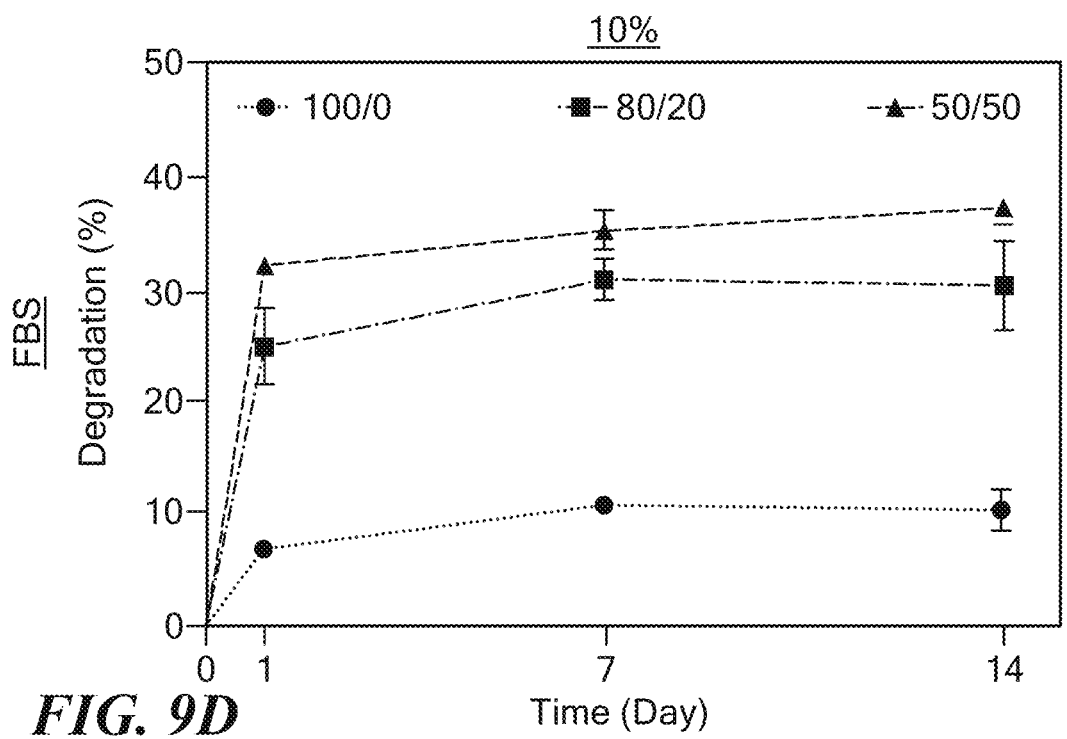
Figure 9E:
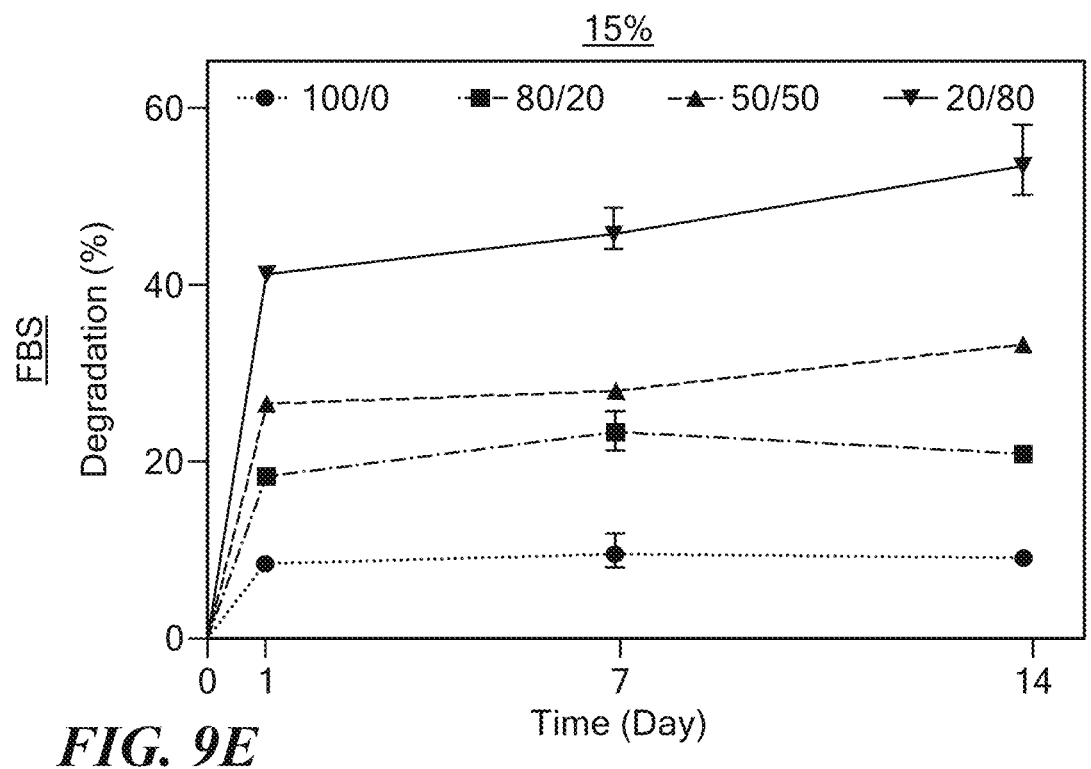
Figure 9F:
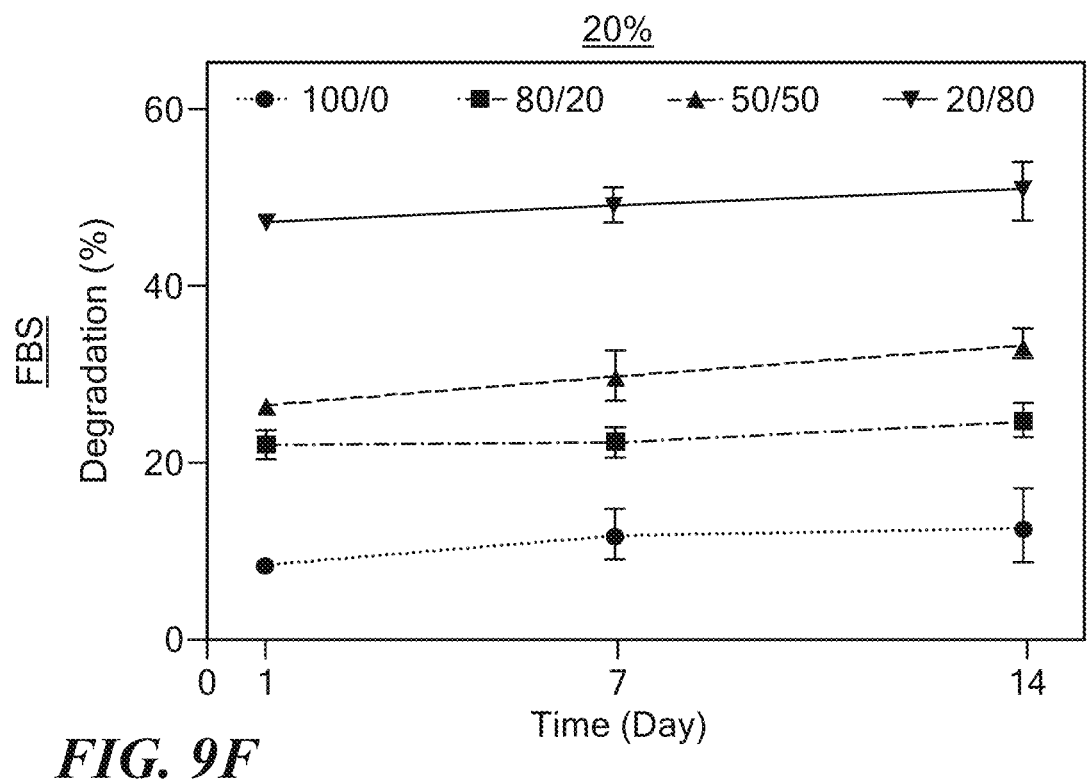

Example 7: In Vivo Biodegradation and Biocompatibility of Engineered GelMA-Bio-IL Hydrogels One of the limitations of conventional conductive polymers is that they are often not biodegradable in vivo and thus may cause persistent inflammation due to their prolonged half-lives in the organism. Interactions of the engineered hydrogels with local tissues and their immunogenicity when implanted subcutaneously in an animal host were analyzed. Explanted samples recovered at days 4, 14, and 28 post-implantation revealed that GelMA-Bio-IL hydrogels exhibited sustained biodegradation throughout the duration of the experiment. See FIG. 6A. This observation indicated that the engineered hydrogels are efficiently degraded in vivo through enzymatic hydrolysis of the polymer scaffold. Visual inspection of the explanted samples also revealed significant infiltration of the gel site by host tissues. See FIG. 6B. Although complete biodegradation of the scaffold was not observed due to the length of the study, it has been reported that GelMA-based hydrogels contain peptide sequences which facilitate cell adhesion and cell-mediated degradation in vivo (Nichol, J. W. et al., 2010, Biomaterials, 31, 5536; Koshy, S. T., et al., 2014, Biomaterials, 35, 2477; Chen, Y C., et al., 2012, Adv Funct Mater, 22, 2027). Biodegradable and biocompatible electroconductive scaffolds with varying degrees of biodegradability may be prepared by conjugating bio-ionic liquid to different polymers with varying degrees of stability. For example, biomaterials with more hydrolytically-stable backbones such as PEG diacrylamide (PEGDAA) (Browning, M. B. et al., 2014, J Biomed Mater Res A, 102, 4244) would be ideal for long-term applications where a more biostable implantable scaffold is needed.

The biodegradability profile of GelMA-Bio-IL hydrogels allows for sustained cellular ingrowth as well as the eventual replacement of the implanted sample with new autologous tissue. Histological assessment of explanted hydrogels revealed ingrowth of predominantly non-inflammatory tissue and low deposition of fibrous collagenous capsule. See FIGS. 6A-6C. This observation was further confirmed by immunohistofluorescence analysis of the explanted samples. Fluorescence immunostaining of CD3 and CD63 antigens showed no sustained infiltration by pro-inflammatory leukocytes (see FIGS. 6F-6H) and macrophages (see FIG. 6I-6K), respectively. The results indicate that GelMA-Bio-IL hydrogels elicit minimal inflammatory responses when implanted subcutaneously in an animal host.

Scaffolds made with a given biopolymer may be particularly suitable for a certain type of physiological response. For example, previous studies have demonstrated the suitability of GelMA-based hydrogels for the induction of angiogenesis (Dreesmann, L. et al., 2007, Biomaterials, 28, 5536). Bio-IL-conjugation of different bioactive polymers such as alginate could be used for studies involving osteogenesis as well as other bone tissue engineering applications (Xia, Y et al., 2012, Journal of Biomedical Materials Research Part A, 100a, 1044).

Physicochemical cues from the extracellular microenvironment play a key role in various physiological and pathological processes that modulate tissue function. For example, after myocardial infarction, the nonconductive nature of the resulting scar tissue leads to electrical uncoupling of the infarcted area, and eventually to ventricular dysfunction. Due to the limited regenerative potential of adult cardiomyocytes, several biomaterial-based tissue engineering approaches for myocardial regeneration have been developed (Sepatafar, M. et al., 2016, Biotechnol Adv, 34, 362). However, the non-conductive nature of most biopolymers greatly diminishes the propagation of electrical stimuli across the scaffold, which raises the risk of generation of arrhythmias after implantation. A biomaterials-based approach like the one presented in this invention can help restore ventricular function by mechanically and electrically coupling the area around the infarcted myocardium. Furthermore, in addition to its role in excitation-contraction coupling, electrical stimulation of cardiomyocytes is also known to modulate cell proliferation and function through the calcium/calmodulin pathway (Titushkin, I., et al., Tissue Eng Part B Rev 2013, 19, 48). The ability of the hybrid GelMA-Bio-IL hydrogels described herein to efficiently transduce multiple physiological stimuli to modulate tissue function holds great potential for use in cardiac tissue engineering applications.

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. A biocompatible conductive hydrogel comprising a biocompatible polymer conjugated to a first ionic constituent of a bio-ionic liquid;
    wherein the bio-ionic liquid has a melting temperature less than 35° C.; and
    wherein the biocompatible polymer and the first ionic constituent are conjugated via a diacrylate linker.

2. The conductive hydrogel of claim 1, wherein the first ionic constituent of a bio-ionic liquid is selected from the group consisting of choline and other organic quaternary amines.

3. The conductive hydrogel of claim 2, wherein the biocompatible polymer is selected from the group consisting of gelatin, elastin, elastin like polypeptides (ELP), collagen, hyaluronic acid (HA), tropoelastin, chitosan, alginate, poly(glycerol sebacate) (PGS), poly(ethylene glycol) (PEG), and poly(lactic acid) (PLA).

4. The conductive hydrogel of claim 1, wherein the conductivity of the hydrogel is at least about $3.0 \times 10^{-5}$ siemens/meter (S/m).

5. The conductive hydrogel of claim 1, wherein the ratio of the biocompatible polymer to the first ionic constituent is from about 1:4 to about 4:1 on a weight basis.

6. The conductive hydrogel of claim 1, wherein the hydrogel is capable of supporting cell proliferation, tissue organization, and/or a function of an excitable cell, such as a nerve cell, a muscle cell, a cardiomyocyte, a fibroblast, a preosteoblast, an endothelial cell, or a mesenchymal stem cell.

7. The conductive hydrogel of claim 1 that is biodegradable.

8. The conductive hydrogel of claim 1, wherein the first ionic constituent is positively charged.

9. A cell scaffold that enables electroactive modulation of cells bound to the scaffold, the scaffold comprising the hydrogel of claim 1.

10. The cell scaffold of claim 9, that further enables one or more of adhesion, proliferation, migration, and differentiation of the cells.

11. The cell scaffold of claim 9, wherein the cells are selected from the group consisting of neurons, cardiomyocytes, fibroblasts, preosteoblasts, endothelial cells, mesenchymal stem cells, and combinations thereof.

12. The cell scaffold of claim 9, further comprising one or more types of cells bound to the scaffold.

* * * * *